US007717653B2

(12) United States Patent
Miyata et al.

(10) Patent No.: US 7,717,653 B2
(45) Date of Patent: May 18, 2010

(54) PROCESSING TOOL

(75) Inventors: Yoshihiro Miyata, Toyota (JP); Makoto Mizumukai, Toyota (JP)

(73) Assignee: Tsukasa Machine Industry Co., Ltd., Toyota-shi (JP)

( * ) Notice: Subject to any disclaimer, the term of this patent is extended or adjusted under 35 U.S.C. 154(b) by 831 days.

(21) Appl. No.: 11/634,935

(22) Filed: Dec. 7, 2006

(65) Prior Publication Data

US 2007/0258782 A1 Nov. 8, 2007

(30) Foreign Application Priority Data

May 8, 2006 (JP) ............................. 2006-129379

(51) Int. Cl.
*B23B 31/02* (2006.01)
(52) U.S. Cl. ........................................ 408/127; 279/16
(58) Field of Classification Search ................ 408/127, 408/141, 238–239 A; 409/232, 234; 279/16–18
See application file for complete search history.

(56) References Cited

U.S. PATENT DOCUMENTS

| 1,357,843 | A | * | 11/1920 | Cashman | 279/16 |
| 1,831,382 | A | * | 11/1931 | Gairing | 279/16 |
| 1,860,762 | A | * | 5/1932 | Wyrick | 464/155 |
| 2,468,396 | A | * | 4/1949 | Frisco | 279/18 |
| 2,475,386 | A | * | 7/1949 | Frisco | 279/16 |
| 2,527,517 | A | * | 10/1950 | Barker et al. | 464/44 |

(Continued)

FOREIGN PATENT DOCUMENTS

CN 1533864 A 10/2004

(Continued)

OTHER PUBLICATIONS

Office Action dated Sep. 18, 2009, issued on the Chinese Patent Application No. 2007101011287 and English translation thereof.

*Primary Examiner*—Daniel W Howell
(74) *Attorney, Agent, or Firm*—Edwards Angell Palmer & Dodge LLP

(57) ABSTRACT

A case is mounted to the outer portion of the bottom portion of the shank through a bearing and an absorption rod is situated in an axial hole provided in the axial direction on the bottom of the shank such that it is slidable in the axial direction. An absorption spring for urging the absorption rod in the axial direction is installed between the absorption rod and the shank and a tiltable case is situated on the bottom within the case such that it is capable of tilting with respect to the axial line. A holder is situated rotatably through a bearing within the tiltable case. A slidable holder provided with a chuck portion for a tool at a leading end thereof is situated slidably in the axial direction and the bottom end portion of the absorption rod and the top end portion of the holder are connected to each other through a universal joint. A tilt supporting pin unit in which a plurality of tilt supporting pins are directed downward and projected by being urged by a spring is situated within a case located around the outer peripheral portion of the universal joint and the tips of the tilt supporting pins of the tilt supporting pin unit are brought into contact with a pressure receiving plate provided above the tiltable case.

11 Claims, 20 Drawing Sheets

U.S. PATENT DOCUMENTS

| | | | | |
|---|---|---|---|---|
| 2,533,758 A | * | 12/1950 | Better et al. | 279/16 |
| 2,675,242 A | * | 4/1954 | Olson | 279/16 |
| 2,981,544 A | * | 4/1961 | Better | 279/16 |
| 3,443,818 A | * | 5/1969 | Fauth | 279/16 |
| 6,974,286 B2 | * | 12/2005 | Lawson | 409/140 |

FOREIGN PATENT DOCUMENTS

| | | |
|---|---|---|
| JP | 7-328905 | 12/1995 |
| JP | 8-57758 | 3/1996 |
| JP | 2002-52434 | 2/2002 |
| JP | 2004-142064 | 5/2004 |
| JP | 2005-349549 A | 12/2005 |

* cited by examiner

PROCESSING TOOL

BACKGROUND OF THE INVENTION

1. Field of the Invention

The present invention relates to a processing tool which is attached detachably to the main spindle of a machine tool such as a machining center so as to execute processing such as chamfering, deburring, or lapping a work piece by rotating a cutter (including a deburring tool, a lapping tool, etc) by means of the main spindle.

2. Description of the Related Art

Conventionally, as a processing tool, which is attached detachably to the main spindle of a machine tool such as a machining center so as to execute processing such as deburring, a deburring unit as disclosed in Japanese Patent Application Laid-Open No. 8-57758 has been known. In this deburring unit, its main body unit can be mounted to the main spindle of a machine tool, an air motor is installed at the bottom of the main body unit in such a condition that it is tilted obliquely downward with a deburring tool attached to the front end of its drive shaft and then, the deburring tool being rotated by the air motor is pressed against the processing face of a work piece so as to deburr the work piece.

However, because the above-mentioned deburring unit drives the deburring tool by means of an air motor, there is a problem in that a supply source for supplying pressurized air to the air motor is required. Furthermore, the air motor is installed on the main body unit in such a way that it is tilted vertically and the tilting direction of the deburring tool mounted to the rotational shaft is therefore determined depending on the tilting angle of the air motor. Thus, the angle (direction) of the main body unit needs to be controlled so that the direction of the cutting edge of the deburring tool is always the appropriate one, thereby resulting in a complication of the required control mechanism and control program.

Further, because the air motor and the deburring tool attached to the front end of the rotational shaft are mounted obliquely in advance, sometimes the tool cannot be controlled smoothly by simply tilting the tool relative to the processing surface of a work piece which has various angles. Consequently, there is a problem in that a process such as deburring the edge portion of a work piece cannot be carried out favorably and smoothly depending on the angle of the processing face.

SUMMARY OF THE INVENTION

The object of the present invention is to provide a processing tool, which is capable of processing a variety of processing faces of a work piece consistently and favorably by executing the tilting operation of the rotating cutter smoothly.

The object of the present invention can be achieved with a processing tool having the following structure.

That is, in the processing tool of the present invention, a shank is attached detachably to the main spindle of a machine tool and the shank and a cutter mounted to the holder are then driven by rotating the main spindle while the holder and cutter are independently tilted with respect to the shank. A case is mounted to the outer side bottom end portion of the shank through a bearing and, the case is provided with a positional engaging portion, which allows a fixed portion of the machine tool to position the outer case in a static state when the tool is mounted to the main spindle. An absorption rod is situated in an axial hole provided in the axial direction in the bottom portion of the shank in such away that it is slidable in the axial direction. An absorption spring to urge the absorption rod downwards in the axial direction is situated between the absorption rod and the shank and a tiltable case is situated in the lower portion of the outer case in such a way that it is capable of tilting with respect to the axial line. The holder is situated rotatably a bearing located within the tiltable case. A slidable holder which is provided with a chuck portion to allow clamping of a tool at the leading end thereof is situated in the axial direction and a positioning spring to urge the slidable holder in the axial direction is installed between the main holder and the slidable holder. The bottom end portion of the absorption rod and the top end portion of the holder are then coupled by means of a universal joint. A tilt supporting pin unit in which a plurality of tilt supporting pins are directed and projected by being urged by the positioning spring is situated within the outer case located in the outer peripheral portion surrounding the universal joint and the tips of the tilt supporting pins of the tilt supporting pin unit are brought into contact with a pressure receiving plate located above the tiltable case.

Preferably, the tilt supporting pin unit is constructed in a manner that a plurality of the tilt supporting pins are situated within a circularly formed pin case in which the tips thereof project downward; a spring is mounted to each tilt supporting pin in such a way that the tilt supporting pin is urged to a project downwards; and the tilt supporting pin unit is situated rotatably in a free state within the outer case.

Preferably, a ball bearing is situated rotatably in a free state on the upper side of the tilt supporting pin unit.

An adjusting nut for height adjustment may be mounted above the ball bearing in the case of engagement of screws the width of gap above the ball bearing may be adjustable by screwing the adjusting nut.

Preferably, the universal joint is constituted of a first universal joint portion connected to the bottom of the absorption rod and a second universal joint portion connected to the top portion of the holder, those universal joint portions being provided on the top and bottom of an intermediate shaft and the first universal joint portion is connected to the absorption rod in such a way that it is capable of tilting in every direction of the circumference and slidable in the axial direction while the second universal joint portion is connected to the holder in such a way that it is also capable of tilting in every direction of the circumference and slidable in the axial direction.

A disc portion may be formed on the intermediate shaft of the universal joint and semi-spherical recessed portions to which a steel ball is fitted may be formed in the first universal joint portion and the second universal joint portion and grooves to which a steel ball is fitted may be formed in the axial direction in joint recessed portions of the absorption rod and the holder.

The tilting case may be situated in such a way that it is capable of tilting in a predetermined angular range through a spherical sliding bearing within the case. The holder may be made rotatable through the use of plural bearings including at least two bearings located within the tiltable case.

Preferably, a metal ball is fitted rotatably in a fitting hole formed in the center of the top end of the first universal joint portion while the metal ball is also fitted to the receiving recessed portion provided in the center of the bottom end portion of the absorption rod; likewise a metal ball is fitted rotatably to the fitting hole formed in the center of the bottom end of the second universal joint portion while the metal ball is also fitted to the receiving recessed portion provided in the center of the top end portion of the holder; when the universal joint rod is in a linear state relative to the absorption rod and the holder, a condition in which the metal balls on both sides engage the receiving recessed portions on both sides; and when the universal joint rod tilts relative to the absorption rod and the holder, the metal ball on at least one side moves outwardly from the center substantially and when the universal joint rod returns to a linear state with tilting load released, it may be constructed so as to return the metal ball substantially to the center of the receiving recessed portion.

Preferably, a disc portion is formed on an intermediate shaft of the universal joint rod; semi-spherical projections are formed near the front end portion of the first universal joint portion and near the bottom end portion of the second universal joint portion; and grooves to which the semi-spherical projections are fitted may be so constructed as to be formed in the joint recessed portions of the absorption rod and the holder.

Preferably, the processing tool further comprises of a positional engaging portion which when the shank is mounted to the main spindle of the machine tool, engages with a fixed portion of the machine tool to position the outer case in a static state, wherein the positional engaging portion is held in place by a holding portion whose positioning pin projects sideways from the outer case in such a way that it is slidable in the vertical direction and urged upwards by a spring; a male screw portion is formed on an outer periphery of the positioning pin; an adjusting nut is mounted on the male screw portion by engagement of the screw; a rotation stopper key is mounted on an outer periphery of the adjusting nut such that the protruding end thereof is capable of engaging an engaging portion in an orientation ring attached to the bottom of the shank while allowing the adjusting nut to rotate; and the positioning pin and rotation stopper key are movable by turning the adjusting nut.

With a processing tool having the above-described structure, the shank and absorption rod may be rotated by rotating the main spindle of the machine tool, the rotation of the absorption rod is then transmitted to the holder through the universal joint, so that the cutter attached to the leading end of the holder is rotated at a high velocity and the cutter comes into contact with the work piece so as to execute processing such as deburring.

When the side face at the front end of the cutter rotating at a high velocity comes into contact with the edge portion of the work piece and the cutter receives a load from sideways, the tiltable case is tilted from the axial line relative to the outer case. At this time, the holder in the tiltable case also tilted by this movement receives the rotational force of the main spindle transferred through the shank, absorption rod and universal joint and the universal joint is rotated with the holder tilted relative to the absorption rod and then, the cutter attached to the leading end of the slidable holder located within the tiltable holder is rotated at a high velocity so as to remove burr generated at the edge portion of a work piece. The force by which the cutter presses against the processing face of the work piece is generated by the force of the plurality of tilt supporting pins within the tilt supporting pin unit pressing against the pressure receiving plate above the tiltable case, so that pressing of the cutter rotating at a high velocity against the work processing face can be carried out stably so as to execute processing such as deburring favorably.

While the holder is tilted, a shock in the axial direction may occur due to a minute change in connecting length between the absorption rod and the holder and vibration of the universal joint. However, the shock is absorbed favorably by the absorption spring provided in the absorption rod and the spring for the slidable holder provided within the tiltable holder. Further, when the cutter receives a pressing force from the work piece, such pressing force against the cutter is absorbed by the spring in the slidable holder so as to operate the cutter rotating at a high velocity in a very stable condition.

When the cutter leaves the work piece so that a rotational load on the cutter drops rapidly and the universal joint and the holder return from a tilted state to a linear state, a phenomenon in which the holder and cutter vibrate (swing randomly) due to vibration of the universal joint or reaction of the tiltable case is likely to occur. However, because in this processing tool, the plurality of tilt supporting pins of the tilt supporting pin unit operate to press against the pressure receiving plate above the tiltable case through the springs and because this tilt supporting pin unit is situated rotatably in a free state in the outer case while the ball bearing is also situated rotatably in a free state in the upper portion of the tilt supporting pin unit, movement of the tilt supporting pin unit in the circumferential direction can be smoothed when the rotational load on the cutter changes and the holder returns to the linear state, thereby preventing vibration of the holder and cutter.

DESCRIPTION OF THE PREFERRED EMBODIMENTS

Hereinafter, the preferred embodiments of the present invention will be described with reference to the accompanied drawings. In the meantime, the present invention is not restricted to these embodiments. Every modification within the scope of claims and equivalent matters concerning the claims are included within the scope of the claims of the present invention.

Figure 1:
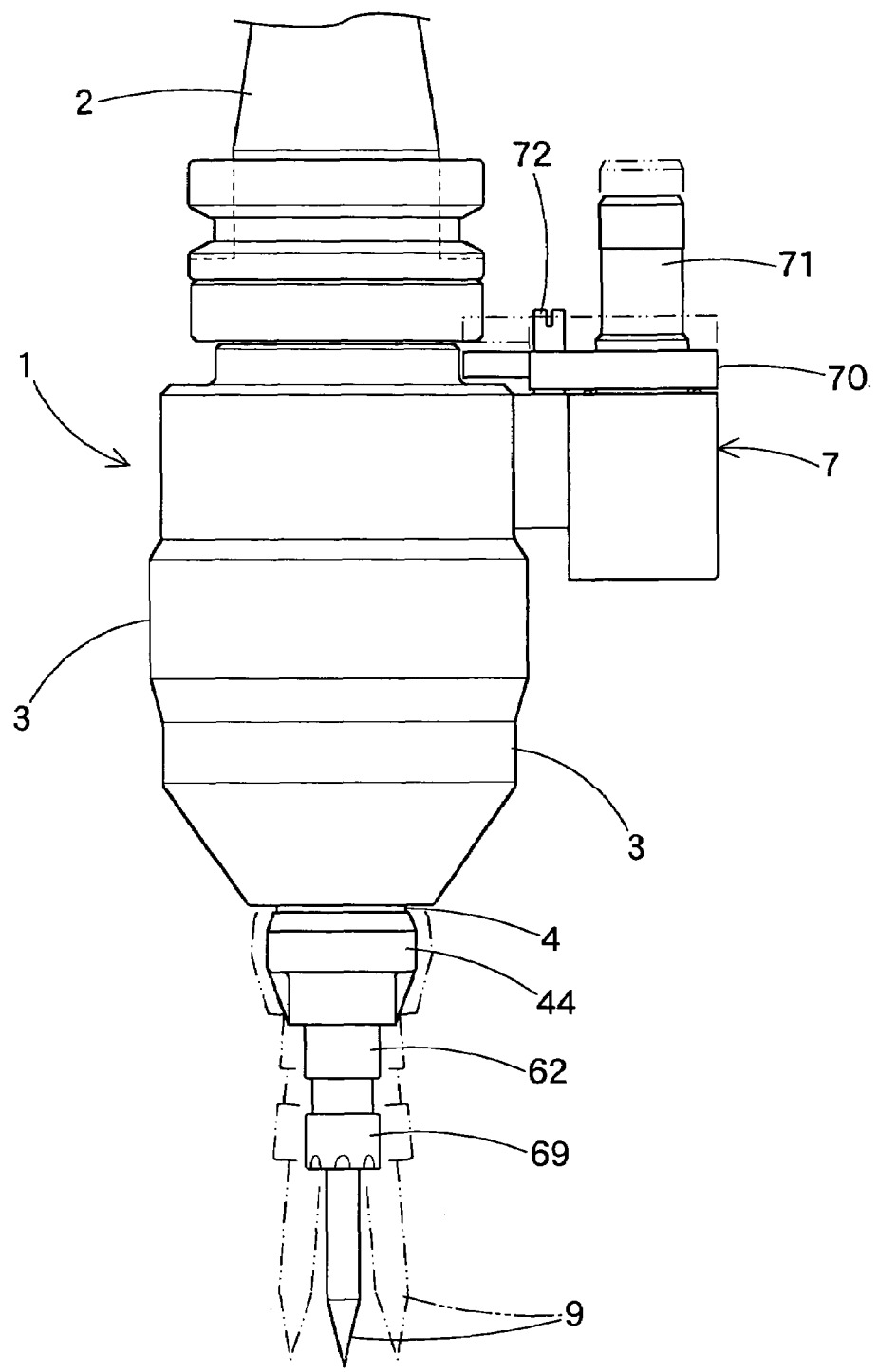
FIG. 1 is a front view of the processing tool according to a first embodiment of the present invention.
Figure 2:
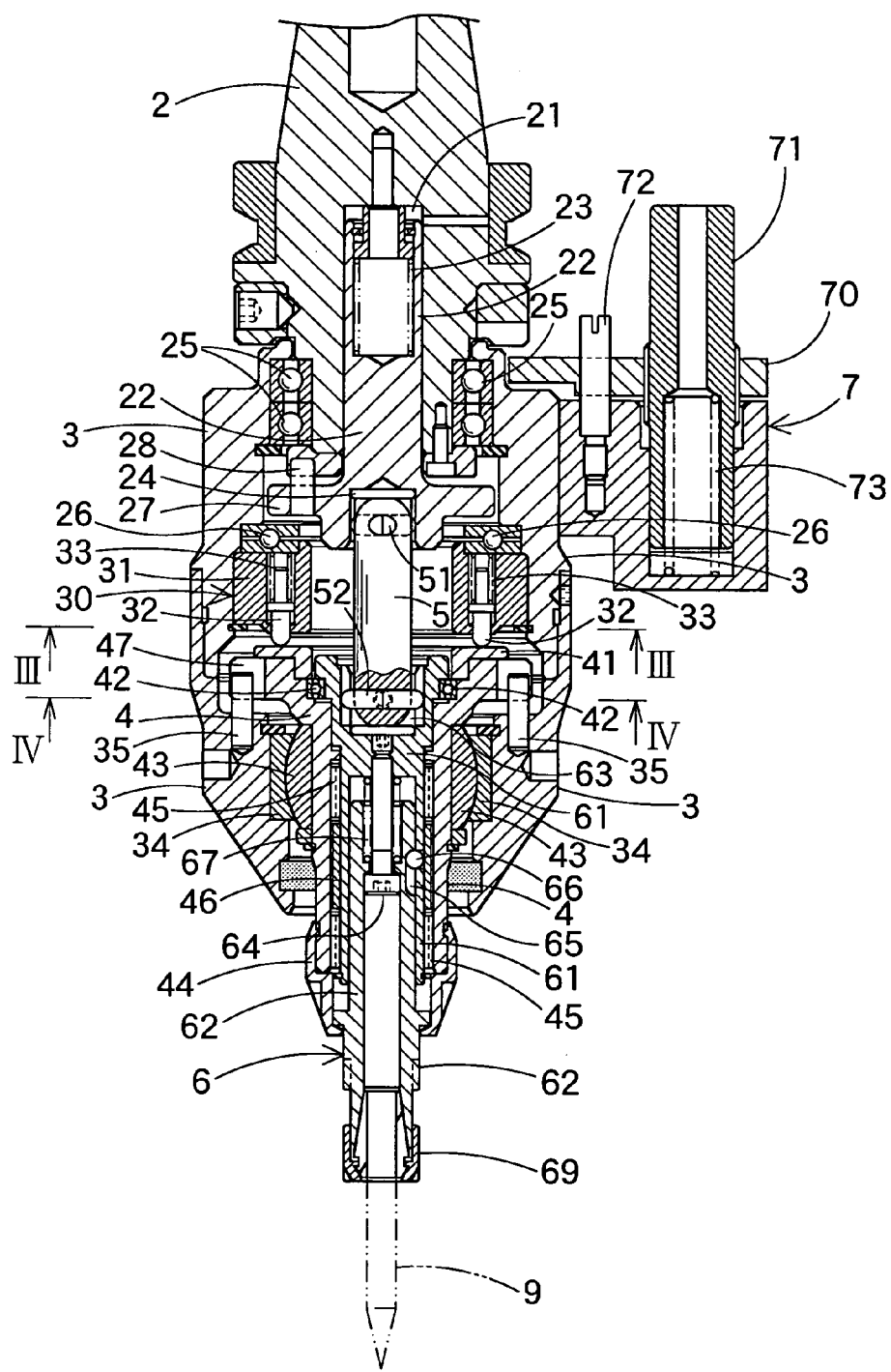
FIG. 2 is a longitudinal sectional view of the same processing tool.

FIG. 1 is a front view of the processing tool of a first embodiment and FIG. 2 is a longitudinal sectional view thereof. In general, this processing tool 1 is mounted by fitting a shank 2 to the main spindle of a machine tool such as a machining center and a universal joint rod 5 and a tiltable case 4 are located within an outer cylindrical case 3 mounted to the bottom portion of the shank 2. A holder 6 for a cutter situated rotatably within the tiltable case 4 is connected to the shank 2 through the universal joint rod 5. The outer case 3 is locked in position with a fixed portion which is part of the machine tool through the use of a positional engagement portion 7, remaining static and the holder 6 held rotatably within the tiltable case 4 is driven by the main spindle so that the cutter 9 attached to the leading end of the holder 6 is rotated so as to execute a deburring operation.

The outer case 3 is formed into a substantially cylindrical shape whose bottom is squeezed and the top portion of the case 3 is fitted to the bottom portion of the shank 2 through first bearings 25 from the outside so that the shank 2 is mounted to the static case 3 rotatably. An axial hole 21 is provided in the bottom portion in the axial direction of the shank 2 from the bottom side and an absorption rod 22 is fitted into that axial hole 21 such that it is movable vertically within a predetermined range. The absorption rod 22 has a flange 27 formed integrally and a joint recessed portion 24 is formed to be open downward in the axial direction of the bottom portion of the absorption rod 22. Substantially semi-circular grooves having a predetermined width are formed in the axial direction at a predetermined interval along the inner peripheral face of the joint recessed portion 24 and with a first universal joint portion 51 of the universal joint rod 5 described later in contact with the joint recess portion 24 so as to allow transmitting of a rotation, the first universal joint portion 51 is fitted in such a way that it is capable of tilting in every direction. The first universal joint portion 51 has a semispherical projection.

A rotation stopper pin 28 is fitted to part of the flange 27 of the absorption rod 22 and between the absorption rod 22 and the shank 2 for the absorption rod 22 to be able to move up/down relative to the shank 2 and transmit a rotation thereof. An axial hole 21 in the axial direction is provided in the top portion of the absorption rod 22 and an absorption spring (coil spring) 23 is situated within the axial hole 21. When the connection length of the universal joint rod 5 changes, this absorption spring 23 operates to absorb the change in the connection length and when the absorption rod 22 receives a force pushing upward, it is compressed and deformed so as to absorb that force thereby urging the absorption rod 22 downwards.

That is, when the universal joint rod 5 and the holder 6 connected under the absorption rod 22 tilt relative to the axial line, the length in the axial direction thereof changes depending on the degree of tilt. To absorb the change in length in the axial direction caused by the tilting of the universal joint rod 5 and the holder 6, the absorption rod 22 is fitted in the shank 2 in such a way that it is slidable therein and the absorption spring 23 is installed.

Further, a tilt supporting pin unit 30 is situated around the universal joint rod 5. This tilt supporting pin unit 30 is constructed so that a plurality of tilt supporting pins 32 are projected downward from the pin case 31 and urged by a spring 33. The pin case 31 of this tilt supporting pin unit 30 is located below a second set of bearings 26 provided within the outer case 3 in a free state. That is, this tilt supporting pin unit 30 is mounted inside the outer case 3 via the second bearings 26 in a free state in such a way that it is freely rotatable although no rotational driving force is applied to the pin case 31 of the tilt supporting pin unit 30.

When a rotational force is applied to the tilt supporting pin unit 30 as the tiltable case 4 and the holder 6 tilt within the outer case 3 or the rotational load on the cutter 9 decreases rapidly so that the tilt state changes to a linear state, the pin case 31 rotates in an arbitrary direction via the second set of bearings 26 and consequently, an action of the tilt case 4 and holder 6 returning to a linear state is carried out smoothly. As for the second set of bearing 26, two annular and sheet-like ball races are stacked vertically such that a plurality of metal balls are accommodated in an annular groove formed inside the ball races.

Figure 3:
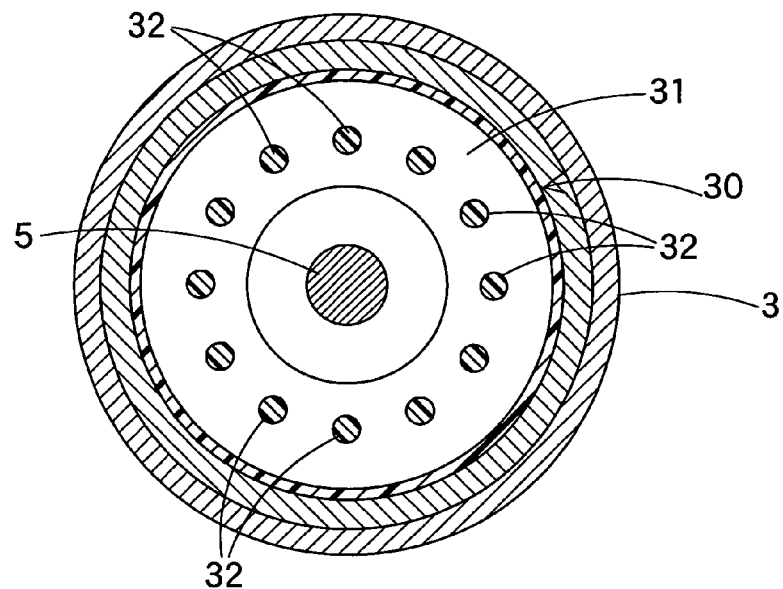
FIG. 3 is a cross-sectional view taken along the lines III-III of FIG. 2.

The pin case 31 of the tilt supporting pin unit 30 mounted inside the outer case 3 via the second bearings 26 is formed in a substantially circular shape as shown in FIG. 3 and for example, twelve tilt supporting pins 32 are arranged around a circumference at an interval of 30 degrees within the pin case 31 in such a way that the tips of the pins 32 project downward. These tilt supporting pins 32 are aligned to press on the circumference of a pressure receiving plate 41 of the tiltable case 4 located therebelow equally and support it. Springs (coil springs) 33 are mounted to each tilt supporting pin 32 to urge the tilt supporting pins 32 downward and each of the tilt supporting pins 32 are urged downwards by each individual spring 33 located within the pin case 31 so that the tip thereof is projected downwards.

The pressure receiving plate 41 of the tiltable case 4 is located below the pin case 31 and the tiltable case 4 and the pressure receiving plate 41 are situated to be able to tilt in every direction within the outer case 3 from a vertical state along the axis. When the tiltable case 4 and the pressure receiving plate 41 tilt in every direction, the twelve tilt supporting pins 32 and springs 33 operate to urge the tilting case 4 and the pressure receiving plate 41 equally in the direction of restoring them to a vertical state. When the cutter 9 at the leading end of the holder 6 makes contact with the processing surface of a work piece, the cutter 9 is pressed in a tilted direction in such a way that the tiltable case 4, holder 6 and cutter 9 tilt. At this time, pressing force which the cutter 9 applies to the processing surface is generated equally along the entire circumference by the springs 33 of the tilt supporting pins 32 and when the pressing force becomes zero, it comes that the tilting state is restored to a linear state smoothly. Because the force of the springs 33 of the tilt supporting pins 32 are applied to the processing surface of the cutter 9 as a pressing force, the force of the spring 33 is set high if the work piece W is hard like steel and set low if it is mild like aluminum.

The tiltable case 4 is formed into a substantially cylindrical shape having a flange on its top portion and positioned in an axial direction within the bottom portion of the outer case 3 such that it is capable of tilting at a predetermined angle via spherical sliding bearings 34, 43. The spherical sliding bearing 34 is provided circularly inside the outer case 3 and the spherical sliding bearing 43 provided on the outer peripheral portion of the tiltable case 4 is embedded in the spherical sliding bearing 34. As a consequence, the tiltable case 4 can only be tilted within a predetermined angular range (for example, about 5 degrees) around the central axis (located on the axis) of the spherical sliding bearings 34, 43.

Figure 4:
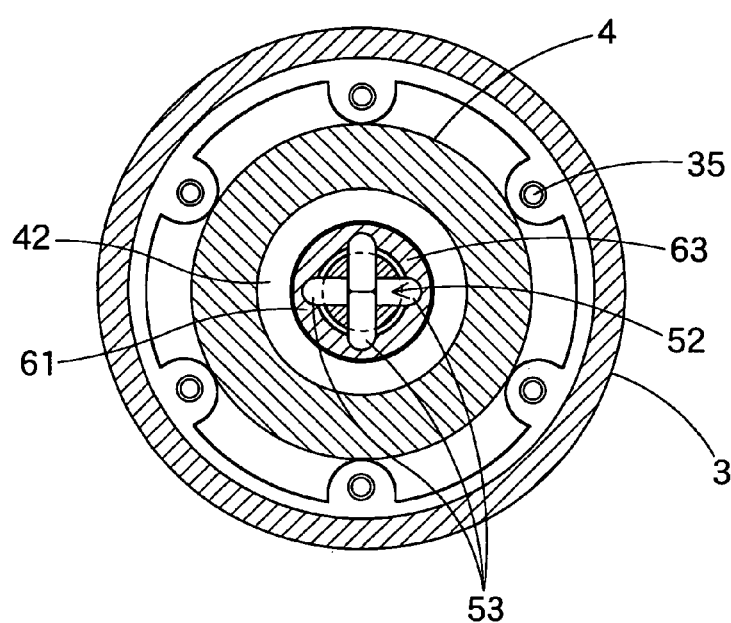
FIG. 4 is a cross-sectional view taken along the lines IV-IV of FIG. 2.
Figure 6:
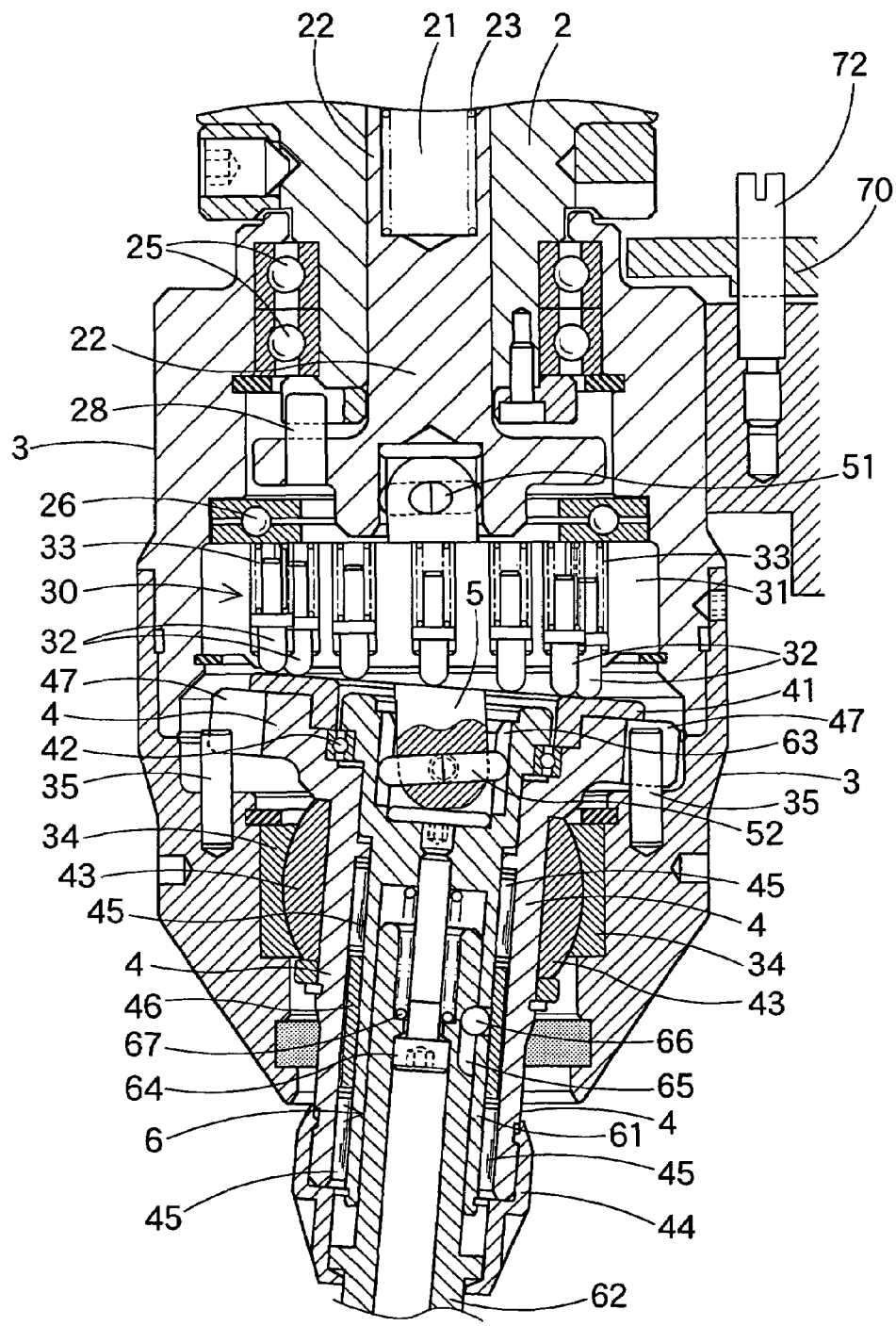
FIG. 6 is an enlarged sectional view of the major portions of a condition in which the holder is tilted.

A flange is provided on the top of the tiltable case 4 and as shown in FIG. 6, six grooves 47 are formed at an interval of 60 degrees around the circumference. As shown in FIGS. 4, 6, six guide pins 35 are erected at circumferential positions corresponding to the grooves 47 inside the outer case 3 and those guide pins 35 engage the grooves 47 so as to guide the tilt of the tiltable case 4.

Although the tilt of the tiltable case 4 is guided by engagement between the guide pins 35 and the grooves 47. There is a gap in that engagement though it is slight. If the connecting angle of the universal joint rod 5 changes or its rotation load changes, the tiltable case 4 receives a reaction force or vibration so that it sometimes may be loose slightly in the circumferential direction. However, although the movement of the tiltable case 4 is transmitted to the tilt supporting pin unit 30, vibration or movement of the holder 6 at the time of tilting or restoration originating from such looseness of the tilting case 4 in the circumferential direction is prevented effectively by the operation of the second bearings 26 and the like because the tilt supporting pin unit 30 and the second bearings 26 are situated in a free state as described above.

The pressure receiving plate 41 is mounted on the flange on the top of the tiltable case 4 and all twelve tilt supporting pins 32 in the pin case 31 always keep contact with the pressure receiving plate 41 regardless of a tilt of the tiltable case 4 as shown in FIG. 6. Further, a dust cover 44 is attached to the bottom portion of the tiltable case 4 so as to cover a gap between the tiltable case 4 and the holder 6 inserted into the tiltable case.

The holder 6 is situated rotatably in an axial direction through a third bearing 42 and a fourth bearing 45 within the cylindrical tiltable case 4. An outer race of the third bearing 42 is fixed to the upper portion of the tiltable case 4 and an inner race of the third bearing 42 is fixed to the large diameter portion on the upper portion of the holder 6. The fourth bearing 45 is constituted of two needle bearings and a collar 46 is interposed between the two needle bearings. As the fourth bearing 45, a sliding bearing may be used instead of the needle bearing.

In the holder 6, a slidable holder 62 is mounted in a predetermined range in the axial direction inside the cylindrical holder main body 61. A joint concave portion 63 is formed to be open upward in the large diameter portion of the upper portion of the holder main body 61 and substantially semi-circular grooves are formed in a predetermined width at a predetermined interval in the inner peripheral face of the joint concave portion 63. A second universal joint portion 52 on the lower portion of the universal joint rod 5 is fitted into this joint concave portion 63 so that the second universal joint 52 engages with the joint concave portion 63, to transmit a rotation from the second universal joint portion 52 to the holder main body 61. The connecting condition of the second universal joint portion 52 and the holder main body 61 can be tilted within a predetermined angular range in every direction.

The universal joint rod 5 is constructed so that the first universal joint portion 51 is formed at the top portion of an intermediate shaft while the second universal joint portion 52 is provided at the bottom of the intermediate shaft and penetrates through a central space in the pin case 31. The first universal joint portion 51 at the top is fitted to the joint concave portion 24 in the absorption rod 22 and the second universal joint portion 52 at the bottom is fitted into the joint concave portion 63 at the upper portion of the holder main body 61. The first universal joint portion 51 is formed by fitting pins each having a spherical tip at an interval of 90 degrees to the outer periphery of the semi-spherical portion at the top end of the universal joint rod 5 such that the spherical tips are projected and the second universal joint portion 52 is also formed by fitting pins each having a spherical tips at an interval of 90 degrees to the outer periphery of the semi-spherical portion at the bottom end of the universal joint rod 5 such that the spherical tips are projected. Further, the universal joint rod 5 can be tilted more smoothly by shifting the positions of the spherical tips fitted to the top end and bottom end of the first and second universal joints 51, 52 projectingly by 45 degrees relative to each other.

The slidable holder 62 is situated within the holder main body 61 of the holder 6 and a bolt-type supporting rod 64 is attached to go through the axial position in order to determine the sliding range and a spring (coil spring) 67 is fitted around the outer peripheral portion of the supporting rod 64 so that the slidable holder 62 is urged downwards. This spring 67 absorbs the force created by sliding the slidable holder 62 upward when the cutter 9 receives a shock from the work piece so as to absorb that shock.

As shown in FIG. 6, an engagement groove 65 is formed in the axial direction in the outer peripheral portion of the slidable holder 62 and a steel ball 66 engages that engagement groove 65. The steel ball 66 also engages an engagement hole on the side of the holder main body 61 so that the holder main body 61 and the slidable holder 62 can be rotated integrally while allowing the slidable holder 62 to slide in the axial direction. A chuck 69, to which the cutter 9, for example a deburring grinder is to be attached, is mounted to the leading end of the sliding holder 62.

Figure 7:
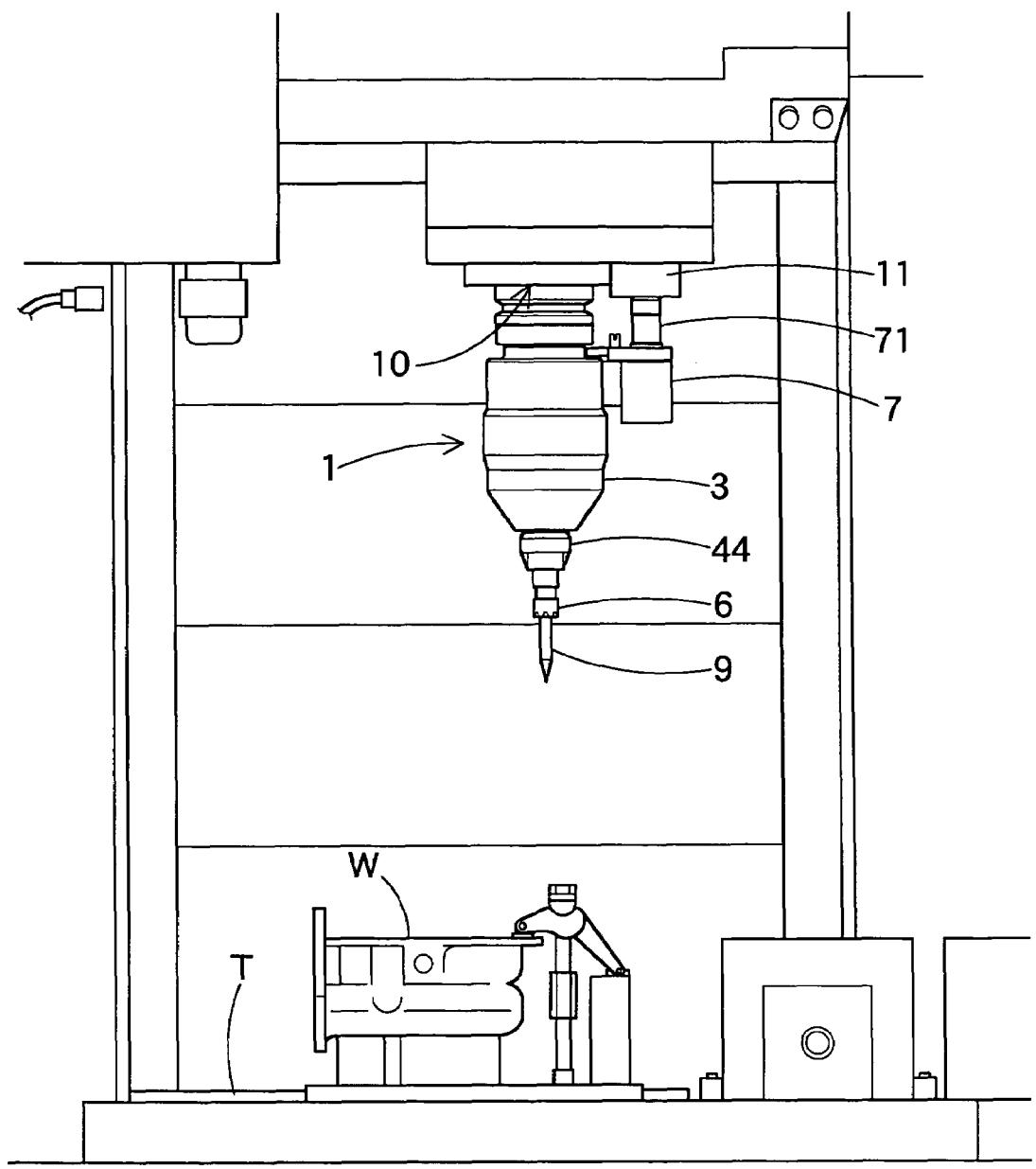
FIG. 7 is a front view showing use condition of the processing tool.

In the processing tool 1 having the above-described structure, the cutter 9, for example, a deburring grinder is attached to a chuck portion 69 at the leading end of the holder 6 and as shown in FIG. 7, the shank 2 is fitted to the main spindle 10 of a machine tool such as a machining center and the positional engagement portion 7 is adjusted to a positioning block on the side of the machine tool spindle and positioned at a predetermined angle.

When the main spindle 10 of the machine tool is rotated, the shank 2 is rotated and then, the absorption rod 22, universal joint rod 5 and holder 6 are rotated by the rotation of the shank 2. The outer case 3 and the tiltable case 4 located on the outside maintain a static state by engagement between the positional engagement portion 7 and the machine tool fixing portion 11. With the outer case 3 and the tiltable case 4 held in the static state, the holder 6 and the cutter 9 gripped thereby are driven at a very high velocity of for example, about 10,000 rpm.

The work piece W, which is a deburring object, is fixed on the movable table of the machine tool as shown in FIG. 7 and the machine tool descends the main spindle 10 to a predetermined position and moves the movable table T on its control coordinates according to a predetermined program with the cutter 9 kept in contact with an edge portion of the work piece W. Consequently, when the contact position of the cutter 9 is moved along the edge portion of the work piece W, burr on the edge portion of the work piece W is ground off by the cutter 9 rotating at a high velocity to execute removal of the burr.

Figure 5:
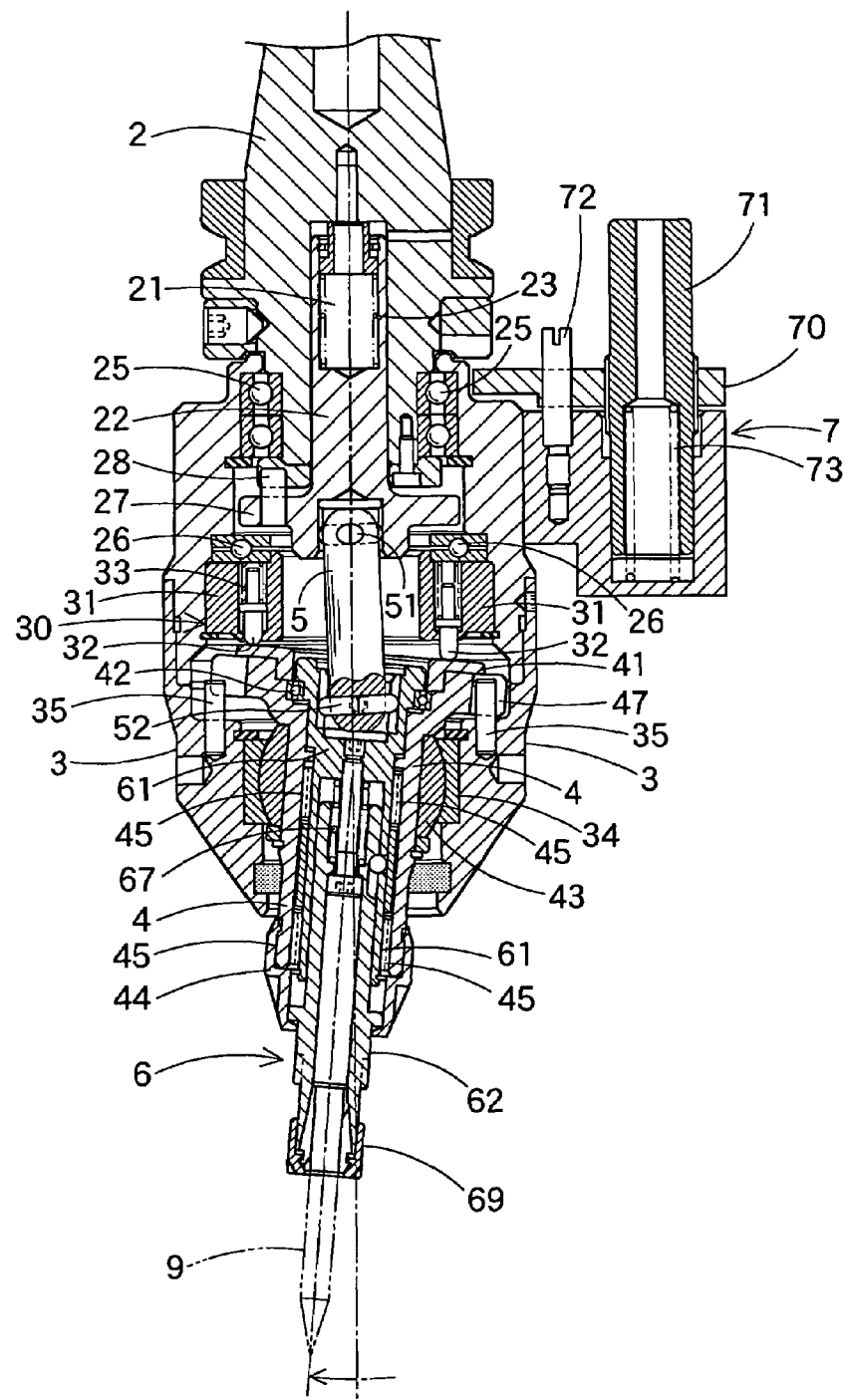
FIG. 5 is a longitudinal sectional view of a condition in which the holder is tilted.

If the side face of the front end of the cutter 9 rotating rapidly comes into contact with the edge portion of the work piece W and the cutter 9 receives a load from sideways, the tiltable case 4 tilts from the axis of the main spindle at an angle corresponding to the load, for example, in an angular range of about 5 degrees in maximum tilting angle with respect to the case 3 located outside. At this time, the tiltable case 4 rotates around a central point of the spherical face of each of the spherical sliding bearings 43, 34 with respect to the outer case 3. The holder 6 within the tiltable case 4 tilted by this rotation receives the rotational force of the main spindle through the shank 2, the absorption rod 22 and the universal joint rod 5 and is rotated. When the holder 6 is tilted together with the tiltable case 4 as shown in FIGS. 5, 6, the holder 6 is tilted around a central point of each of the spherical sliding bearings 34, 43 on the lower side relative to the connecting portion with the universal joint rod 5 on the top end thereof and the universal joint rod 5 tilts around the vicinity of its intermediate point.

Thus, when the universal joint rod 5 and the holder 6 are tilted, vibration in the axial direction and the like occur due to a minute change in the connecting length between the absorption rod 22 and the universal joint rod 5 and the connecting length between the universal joint rod 5 and the holder 6. Vibration in the axial direction and shock on the absorption rod 22 and universal joint rod 5 are absorbed favorably by the absorption spring 23 in the absorption rod 22. Because the vibration in the axial direction of the absorption rod 22 and the universal joint rod 5 when the holder 6 is tilted is absorbed by the absorption spring 23, when tilting the holder 6 with the cutter 9 kept in contact with the work piece W, the holder 6 can be tilted smoothly while maintaining a rapid rotation of the cutter 9 stably When the front end of the cutter 9 rotating at a high velocity comes into a contact with the edge portion of the work piece W, a push-up force in the axial direction received by the cutter 9 from the work piece is absorbed by the spring 67 of the slidable holder 62 so as to stabilize the processing. As shown in FIG. 5, the cutter 9 tilts together with the holder 6 so as to remove burr while the front end side of the cutter 9 is applying an appropriate contact load to a burred portion of the work piece W. A pressing load when the front end of the cutter 9 presses against the work piece W is applied to the pressure receiving plate 41 on the top end of the holder 6, the pressing load being applied by a plurality of tilt supporting pins 32 each having a spring 33 within the tilt supporting pin unit 30. Because these tilt supporting pins 32 are placed in multiple quantity around the circumference, they can apply the same load in a stable condition even when the cutter 9 and the holder 6 are tilted in any direction so as to execute deburring of the work piece W favorably.

Although force of the spring 33 of the tilt supporting pin 32 acts as a pressing load on the cutter 9 against the work piece W, the force which applies the pressing load to the work piece W is given by the plurality of springs 33 placed around the circumference, different from absorption spring 23 and spring 67 for absorbing force in the axial direction of the holder 6 and universal joint rod 5, so that the cutter 9 can generate a force of pressing the work piece W stably.

Further, when the cutter 9 leaves the work piece W, the tilting state of the cutter 9 and the holder 6 can be returned to a linear state. Particularly, when the holder 6 returns to the linear state with its rotation load dropped rapidly and its tilting load released, a condition in which the returning motion of the holder rotating rapidly becomes unstable so that the holder 6 vibrates or swings randomly and cannot return to a linear state easily is likely to occur.

However, in this processing tool, as described above, a shock and vibration in the axial direction generated from the absorption rod 22 and the universal joint rod 5 is absorbed by the absorption spring 23, a load received by the cutter 9 from the work piece is absorbed by the spring 67 in the holder main body 61 and a force of returning from a tilted state to a linear state of the holder 6 is absorbed by the spring 33 within the independent tilt supporting pin unit 30. Consequently, when the cutter 9 leaves the work piece W, the holder 6 can return to a linear state smoothly without vibration. Further, because the tilt supporting pin unit 30 is situated in a free condition and mounted through the second bearings 26 in a free condition, the tilt supporting pin unit 30 moves along the circumference direction when it tilts so as to absorb a reaction of the tiltable case 4 thereby bringing back the holder 6 and the cutter 9 to a linear state smoothly.

Figure 8:
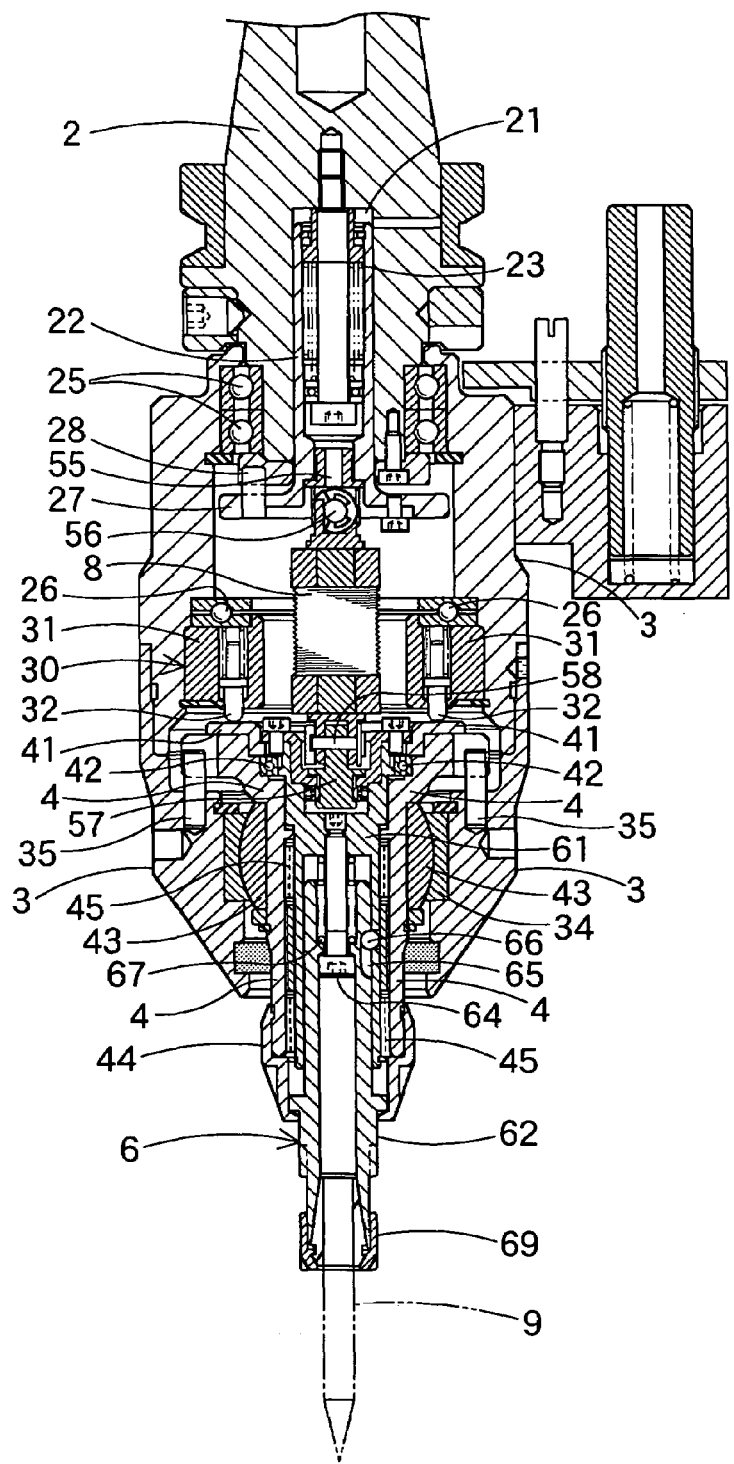
FIG. 8 is a longitudinal sectional view of the processing tool according to other embodiments.

Although in the above embodiment, the universal joint rod 5 is used to connect the absorption rod 22 with the holder 6, a bellows type universal joint 8 as shown in FIG. 8 may be used instead of the universal joint rod 5. This bellow type universal joint 8 is connected between the absorption rod 22 and the holder main body 61 through connecting shafts 56, 58 provided on the top and bottom of the bellows.

That is, a mounting unit 55 is fixed within a joint recessed portion provided in the center of the bottom of the absorption rod 22 and the mounting unit 55 and the top portion of the bellows type universal joint 8 are connected through the connecting shaft 56. Further, another mounting unit 57 is fixed within the joint recessed portion provided in the center of the top portion of the holder main body 61 and the mounting unit 57 and the bottom portion of the bellows type universal joint 8 are connected through the connecting shaft 58.

When the absorption rod 22 and the holder 6 are connected using such a bellows type universal joint 8, the holder 6 and the cutter 9 can also be tilted favorably depending on the pressing force which the cutter 9 receives from the work piece W from sideways at the time of processing such as the above described case.

Figure 9:
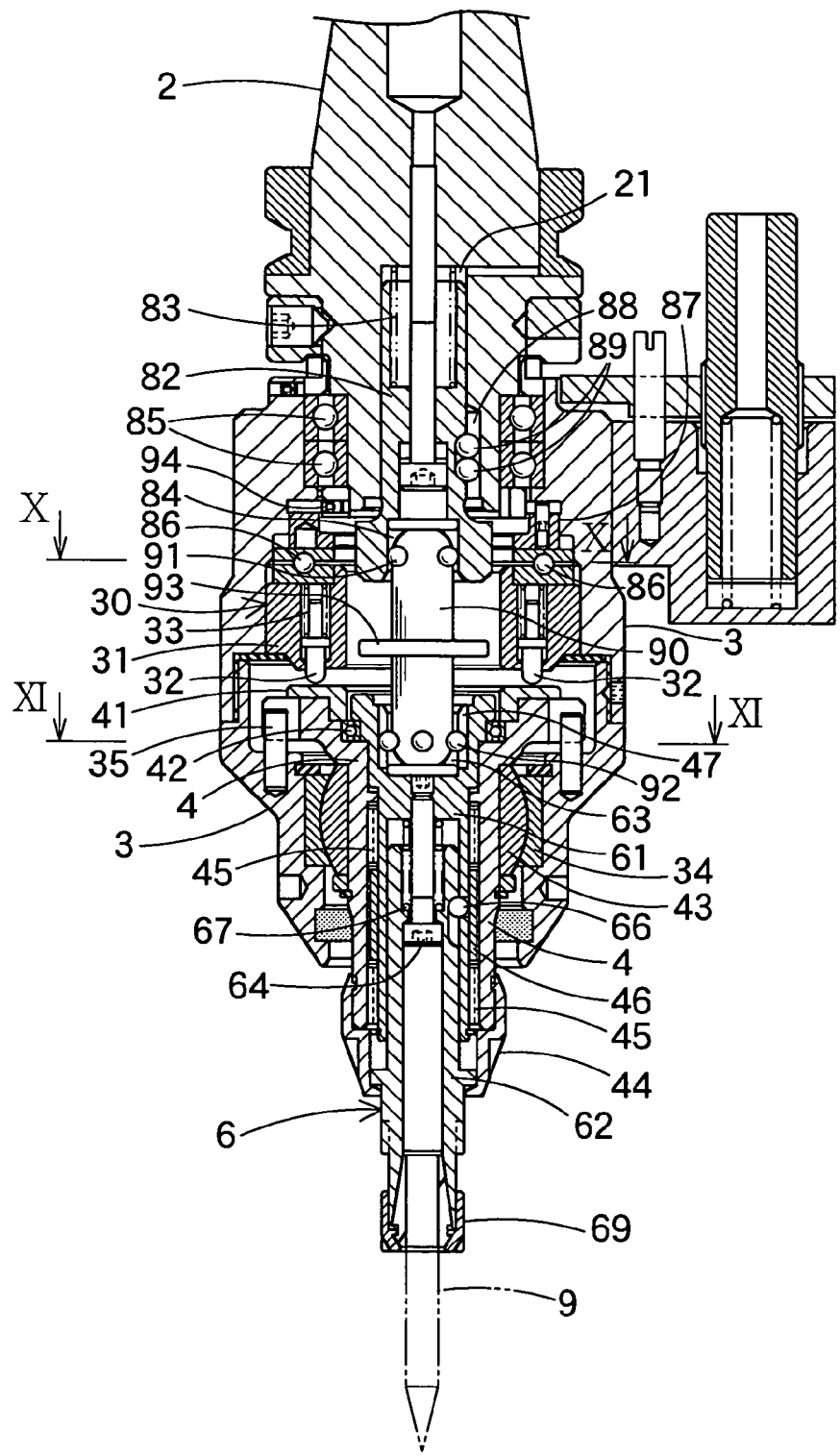
FIG. 9 is a longitudinal sectional view of the processing tool according to a second embodiment.
Figure 10:
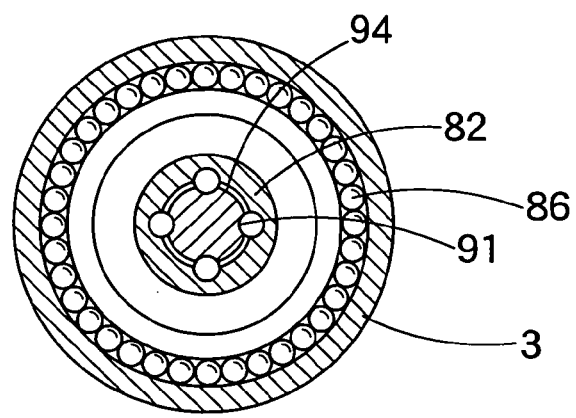
FIG. 10 is a cross-sectional view taken along the lines X-X of FIG. 9.
Figure 11:
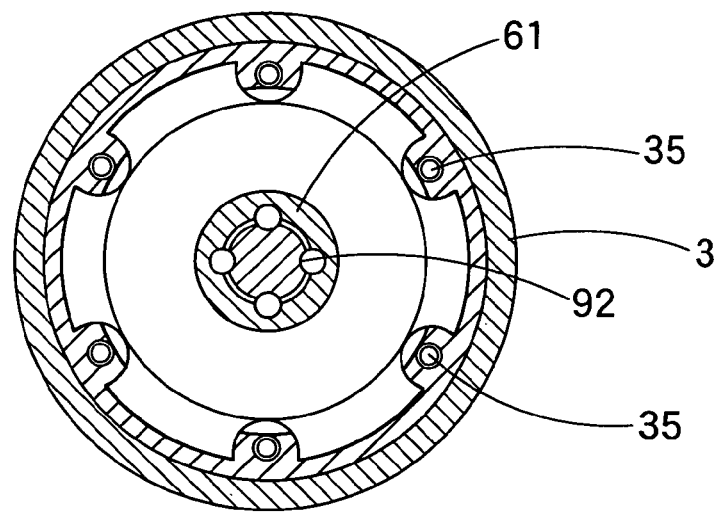
FIG. 11 is a cross-sectional view taken along the lines XI-XI of FIG. 9.

FIG. 9 shows a sectional view of the processing tool of a second embodiment. According to this embodiment, a height adjusting nut 87 for adjusting the height position of the second set of bearings 86 and the pin case 31 is provided and the rotation stopper pin 28 which blocks the absorption rod from rotating is changed to an engaging groove 88 and engaging spheres (metal ball) 89 and further, a disc portion 93 is provided at an intermediate portion of the universal joint rod 90 for stabilization.

As the first bearing 85, an angular bearing having a load bearing property to trust a load is used and when the first bearing 85 is installed, it is installed by applying preload using a cap screw. Like reference numerals are attached to the same components as the first embodiment and a description thereof is omitted.

As shown in FIG. 9, the angular bearing is located between a bottom end portion of the shank 2 and the top portion of the outer case 3 as a first bearing 85 and this first bearing 85 is installed with preload applied using a cap screw 94. An engaging groove 88 is formed along the axis in the side wall in the axial hole 21 provided in an axial position of the shank 2 and an outer peripheral portion of an absorption rod 82 fitted therein and engaging spheres 89 are fitted in the engaging groove 88 and the absorption rod 82 is installed in such a way that it is slidable only in the axial direction relative to the shank 2 by the engaging spheres 89.

A second bearing 86 is accommodated below the first bearing 85 in a free condition and a ring-like height adjusting nut 87 is screwed inside the outer case 3 so as to be able to adjust the screwing width in order to adjust the height position of the second bearing 86 so that the amount of space for accommodating the second bearing 86 can be adjusted. Further, the universal joint rod 90 is provided with a disc portion 93 at its intermediate portion for stabilizing the rotation. The universal joint rod 90 can be rotated at a high velocity stably by this disc portion 93.

In this processing tool, the shank 2 is rotated by rotating the main spindle of machine tool in the same way as described above and the absorption rod 82, the universal joint rod 90 and the holder 6 are rotated by the rotation of the shank 2. The outer case 3 and the tiltable case 4 situated outside of the universal joint rod 90 and the like maintain static condition by an engagement between the positional engaging portion 7 and machine tool fixing portion 11 and with the outer case 3 and the tiltable case 4 kept in the static condition, the holder 6 and the cutter 9 gripped thereby are rotated at a high velocity.

If the cutter 9 receives a load from sideways when the side face at the front end of the cutter 9 rotated at a high velocity comes into contact with the edge portion of the work piece W, the tiltable case 4 is tilted by about 5 degrees in the maximum tilting angle from the axis of the main spindle relative to the case 3 located outside thereof. At this time, the tiltale case 4 rotates around a central point of the sphere through spherical sliding bearings 43, 34 relative to the outer case 3, the holder 6 in the tiltable case 4 tilted by this rotation is rotated receiving the rotational force of the main spindle through the shank 2, the absorption rod 82 and the universal joint 90. When the tiltable case 4 and the holder 6 are tilted, the holder 6 is tilted around the central point of the spherical sliding bearings 34, 43 located below the connecting portion with the universal joint 90 located at a top end thereof and the universal joint rod 90 is tilted around the vicinity of the top end portion.

When the universal joint rod 5 and the holder 6 tilt, the connection length between the absorption rod 82 and the universal joint rod 90 and the connection length between the universal joint rod 90 and the holder 6 changes minutely so that vibration or shock in the axial direction likely occurs. The vibration and shock in the axial direction are absorbed by an absorption spring 83 in the absorption rod 82 and a push-up force received by the cutter 9 from the work piece is absorbed by the spring 67 in the holder's main body 61.

When the holder 6 and the cutter 9 tilt so as to remove burr, a load received by the work piece W from the cutter 9 is supplied by the spring 33 of each of twelve tilt supporting pins 32 located around the circumference of the pin case 31 so that a stabilized processing load is applied by the spring 33 to faces at every angle of the work piece W even if the cutter 9 is tilted in any direction thereby achieving processing such as deburring very smoothly.

The force by which the cutter 9 presses the work piece W is supplied by a plurality of the springs 33 located around the circumference of the tilt supporting pin unit 30, not by the absorption spring 83 or the spring 67 for absorbing a shock and the like in the axial direction of the holder 6 or the universal joint rod 90. Further, the second bearing 86 located just above the tilt supporting pin unit 30 is situated in a free state with the height adjusted. Consequently, when the pin case 31 receives a force along the circumference due to an influence of the universal joint rod 90 rotating at a high velocity, the second bearing 86 in the free state allows the pin case 31 to rotate freely, the holder 6 and the cutter 9 can be brought back from a tilting state to a linear state smoothly when the cutter 9 leaves the work piece W.

Figure 12:
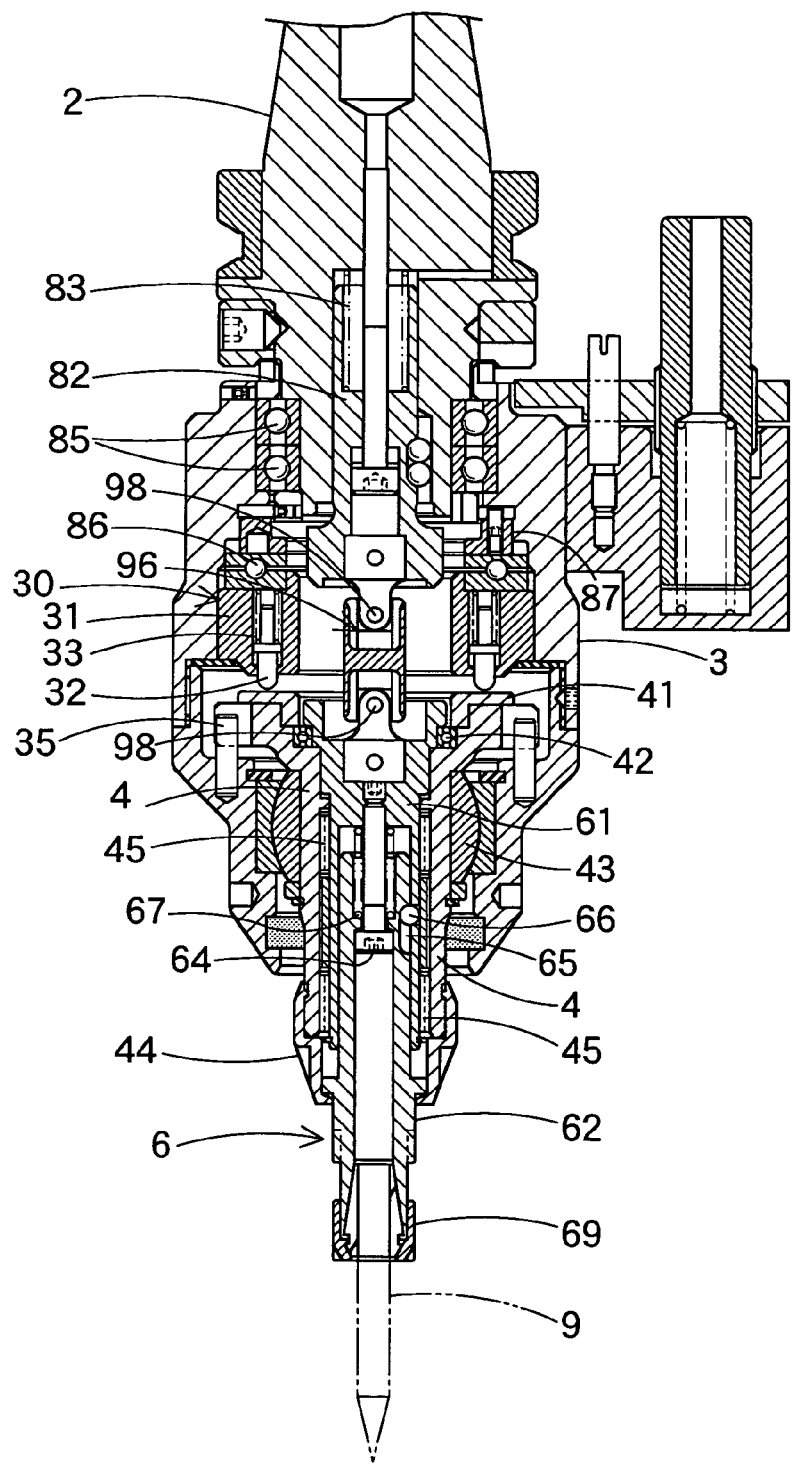
FIG. 12 is a longitudinal sectional view of the processing tool according to other embodiments.
Figure 13:
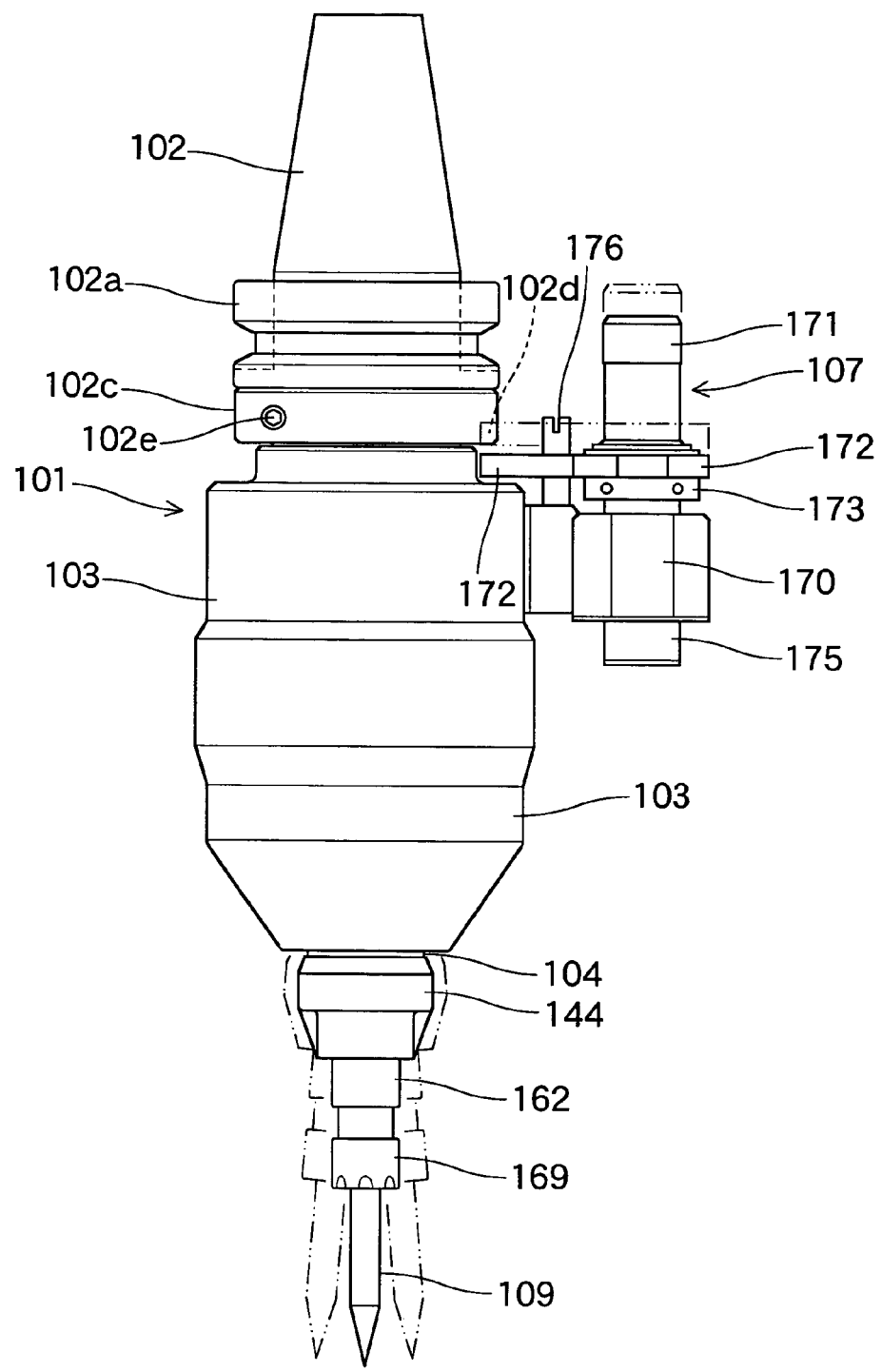
FIG. 13 is a front view of the processing tool according to a third embodiment of the present invention.
Figure 14:
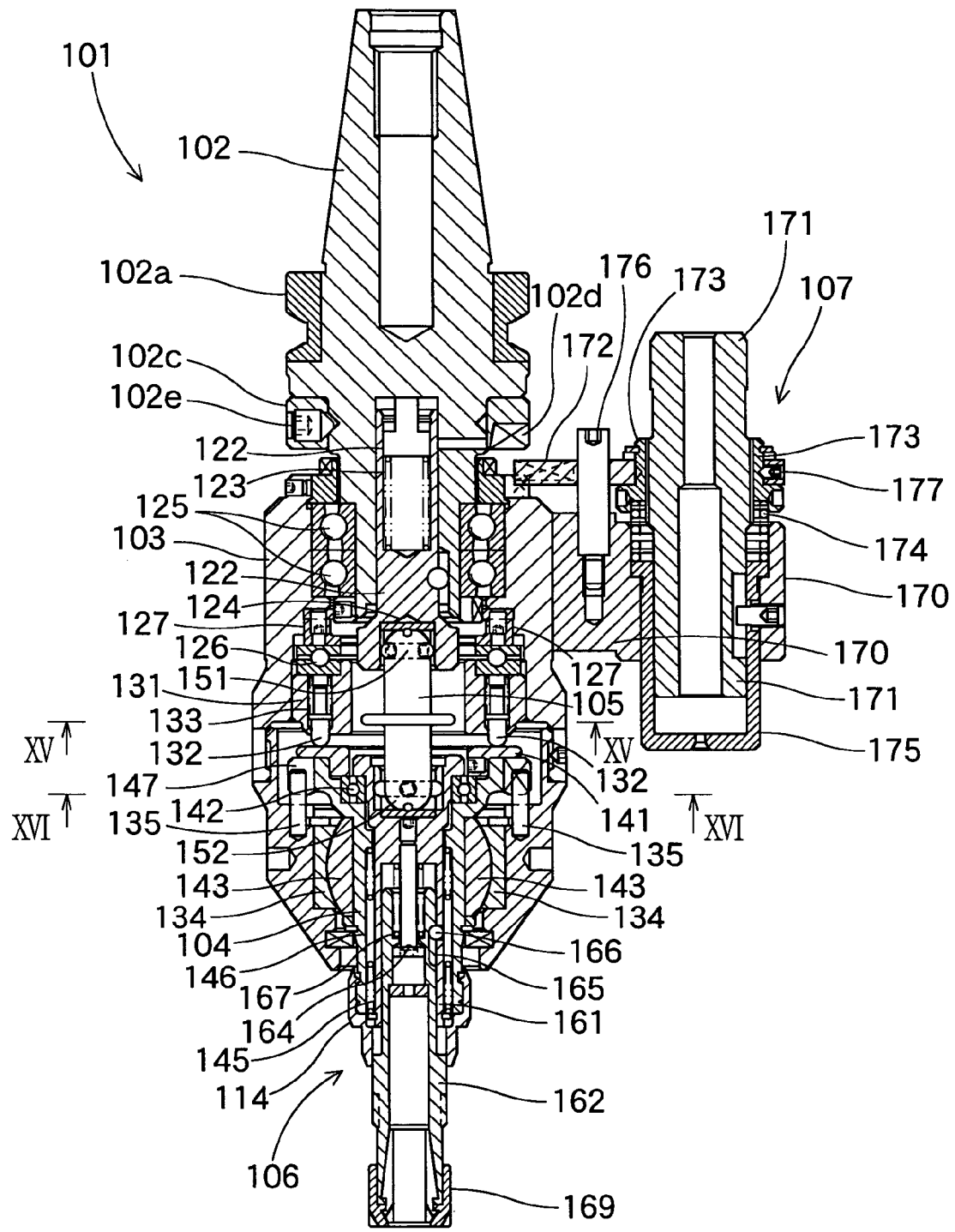
FIG. 14 is a longitudinal sectional view of the same processing tool.

Although in the above embodiment, the universal joint rod 90 is used to connect the absorption rod 82 with the holder 6, a universal joint 96 having a structure using a biaxial shaft coupling at the top and bottom as shown in FIG. 12 may be used instead of the universal joint 90. In this universal joint 96, a biaxial shaft coupling 97 is provided at the top and a biaxial shaft coupling 98 of the same type is provided at the bottom with an intermediate shaft interposed therebetween.

The upper shaft coupling 97 is connected to the mounting unit provided in the joint recessed portion provided in the center of the bottom portion of the absorption rod 82 and the lower shaft coupling 98 is connected to the mounting unit provided in the center of the top portion of the holder's main body 61. Even if the absorption rod 82 and the holder 6 are connected using the universal joint 96, the holder 6 and the cutter 9 can be tilted stably corresponding to a pressing force received by the cutter 9 from a work piece from sideways.

In the above embodiment, a deburring tool is used as the cutter 9 and grinding such as lapping, chamfering can be executed using a lapping grind stone or a grinding tool.

According to the processing tool having the above structure, a structure for absorbing each movement by a spring situated separately or applying a load thereby is provided by absorbing shock in the axial direction generated by the holder or universal joint by means of an absorption spring provided in the absorption rod, absorbing a push-up force received by the cutter from the work piece by means of a spring provided in the sliding holder and further, generating a reaction force when the cutter receives a tilting force from the work piece and consequently the holder is tilted, with a force by which a plurality of the tilt supporting pins positioned around the circumference of the tilt supporting pin unit presses against the pressure receiving plate on the top of the tilting case. Consequently, no vibration is generated when the cutter is tilted or returned to a linear state so that pressing of the cutter rotating rapidly against a work piece processing face is carried out smoothly and stably, thereby executing processing such as deburring favorably.

FIGS. 13-23 show a processing tool of a third embodiment. In general, this processing tool 101 is mounted by fitting a shank 102 to the main spindle of a machine tool such as a machining center and a universal joint rod 105 and a tiltable case 104 are situated within a cylindrical case 103 mounted to the bottom portion of the shank 102. A holder 106 for a cutter installed rotatably within the tilting case 104 is connected to the shank 102 through the universal joint rod 105. The case 103 is engaged with a positioning block 111 which is part of the machine tool through a positional engaging portion 107, remaining static and the holder 106 held rotatably within the tiltable case 104 is driven by the main spindle so that the cutter 109 attached to the leading end of the holder 106 is rotated so as to execute deburring operation.

The case 103 is formed into a substantially cylindrical shape whose bottom is squeezed and the top portion of the case 103 is fitted to the bottom portion of the shank 102 through first bearings 125 from the outside so that the shank 102 is mounted to the static case 103 rotatably. An angular bearing having a load bearing property to thrust a load is used as the first bearing 125 and when installing the first bearing 125, it is installed by applying preload using a cap screw. An axial hole 121 is drilled in the bottom portion in the axial direction of the shank 102 from below and an absorption rod 122 is fitted into the axial hole 121 from below in such a way that it is movable within a predetermined range.

A joint concave portion 124 is formed in the bottom portion of the absorption rod 122 such that it is open downward. Substantially semi-circular grooves having a predetermined width are formed in the axial direction at a predetermined interval in the inner peripheral face of the joint recessed portion 124 and with a first universal joint portion 151 of the universal joint rod 105 described later engaged with the joint recessed portion 124 so as to transmit a rotation, the first universal joint portion 151 is fitted in such a way that it is capable of tilting in every direction. The first universal joint portion 151 has four semi-spherical projections 153, which are provided projectingly at an interval of 90 degrees in the radial direction.

To connect the absorption rod 122 to the shank 102 in such a way that it is movable vertically and capable of transmitting a rotation, an axial hole 121 is drilled in the axial direction in the top portion of the absorption rod 122 and an absorption spring (coil spring) 123 is inserted in the axial hole 121. When the connecting length of the universal joint rod 105 changes, the absorption spring 123 operates so as to absorb the change in the connecting length and when it receives a level of force in which the absorption rod 122 is pushed up, the absorption spring 123 is compressed and deformed so as to absorb this force so that it urges the absorption rod 122 downwards.

Further, when the universal joint rod 105 and the holder 106 connected under the absorption rod 122 tilt relative to the axial line, the length in the axial direction thereof changes depending on the degree of tilt. To absorb a change in length in the axial direction caused by the tilting of the universal joint rod 105 and the holder 106, an absorption rod 122 is fitted in the shank 102 in such a way that it is slidable therein and the absorption spring 123 is activated. A semi-spherical recessed portion is formed in the outer peripheral portion of the absorption rod 122 and a metal ball 159 is fitted loosely in that semi-spherical recessed portion. The outward portion of the metal ball 159 is fitted to an engaging groove 128 formed in the side wall within the axial hole 121 drilled in the axial direction of the shank 102 and the absorption rod 122 is mounted slidably in the axial direction relative to the shank 102 by engagement of this metal ball 159.

A disc portion 105a is provided on an intermediate portion of the universal joint rod 105 for stabilization during rotation. The universal joint rod 105 can then be rotated at a high velocity by including this disc portion 105a. Further, a tilt supporting pin unit 130 is situated around the universal joint rod 105. This tilt supporting pin unit 130 is constructed so that a plurality of tilt supporting pins 132 are projected downward from the pin case 131 and urged by a spring 133. The pin case 131 of this tilt supporting pin unit 130 is located below a second set of bearings 126 provided within the case 103 in a free state. That is, the tilt supporting pin unit 130 is mounted inside the case 103 via a second set of bearings 126 in a free state such that it is freely rotatable although no rotational driving force is applied to the pin case 131 of the tilt supporting pin unit 130.

The second bearings 126 are accommodated in the top portion of the pin case 131, within the case 103 in a free state and to adjust the height position of the second bearings 126, a ring-like adjusting nut 127 is screwed into the inside of the case 103 so as to be able to adjust the screwing width, so that the height in which the second bearing 126 is accommodated can be adjusted.

When a rotational force is applied to the tilt supporting pin unit 130 as the tilt case 104 and the holder 106 tilt within the case 103 or a rotation load on the cutter 109 decreases rapidly so that the tilt state changes to a linear state, the pin case 131 rotates in an arbitrary direction via the second bearings 126 and consequently, an action of the tilt case 104 and holder 106 returning to a linear state is carried out smoothly. As for the second set of bearings 126, two annular and sheet-like ball races are stacked vertically such that a plurality of metal balls are accommodated in an annular groove formed inside the ball races.

Figure 15:
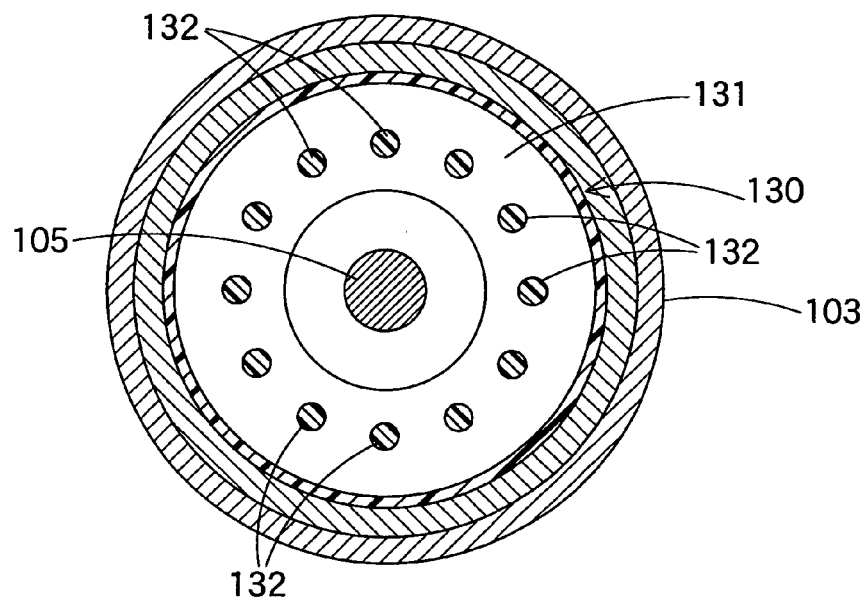
FIG. 15 is a cross-sectional view taken along the lines XV-XV of FIG. 14.

The pin case 131 of the tilt supporting pin unit 130 mounted inside the case 103 via the second bearings 126 are formed in a substantially circular shape as shown in FIG. 15 and for example, twelve tilt supporting pins 132 are arranged around a circumference at an interval of 30 degrees within the pin case 131 such that the tips of the pins 132 project downward. These tilt supporting pins 132 are arranged to press on the circumference of a pressure receiving plate 141 of the tiltable case 104 located therebelow equally and support it. Springs (coil springs) 133 are mounted to each tilt supporting pin 132 to urge the tilt supporting pins 132 downwards and each of the tilt supporting pins 132 is urged downwards by each spring 133 located within the pin case 131 so that the tip thereof is projected downwards.

The pressure receiving plate 141 of the tiltable case 104 is located below the pin case 131 and the tiltable case 104 and the pressure receiving plate 141 are situated to be able to tilt in every direction within the outer case 103 from a vertical state along the axis. When the tiltable case 104 and the pressure receiving plate 141 tilt in every direction, the twelve tilt supporting pins 132 and springs 133 operate to urge the tiltable case 104 and the pressure receiving plate 141 equally in the direction of restoring them to a vertical state. When the cutter (tool tip) 109 at the leading end of the holder 106 makes contact with the processing surface of a work piece, the cutter 109 is pressed in a tilted direction in such a way that the tiltable case 104, holder 106 and cutter 109 tilt. At this time, pressing force which the cutter 109 applies to the processing surface is generated equally along the entire circumference by the springs 133 of the tilt supporting pins 132 and when the pressing force becomes zero, the tilting state is restored to a linear state smoothly. Because the spring force of the spring member 133 of the tilt supporting pin 132 is applied to the processing surface of the cutter 109 as a pressing force, the force of the spring 133 is set high if the work piece W is hard like steel and low if it is mild like aluminum.

The tiltable case 104 is formed into a substantially cylindrical shape having a flange on its top portion and positioned in an axial direction within the bottom portion of the case 103 such that it is capable of tilting at a predetermined angle via spherical sliding bearings 134, 143. The spherical sliding bearing 134 is provided circularly inside the case 103 and the spherical sliding bearing 143 provided on the outer peripheral portion of the tiltable case 104 is embedded in the spherical sliding bearing 134. As a consequence, the tiltable case 104 can also be tilted within a predetermined angular range (for example, about 5 degrees) around the central axis (located on the axis) of the spherical sliding bearings 134, 143.

Figure 16:
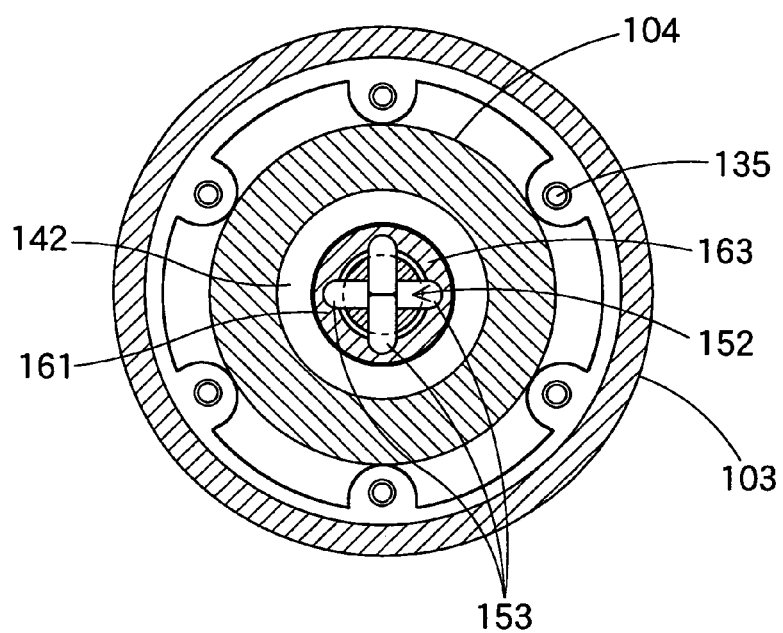
FIG. 16 is a cross-sectional view taken along the lines XVI-XVI of FIG. 14.
Figure 23:
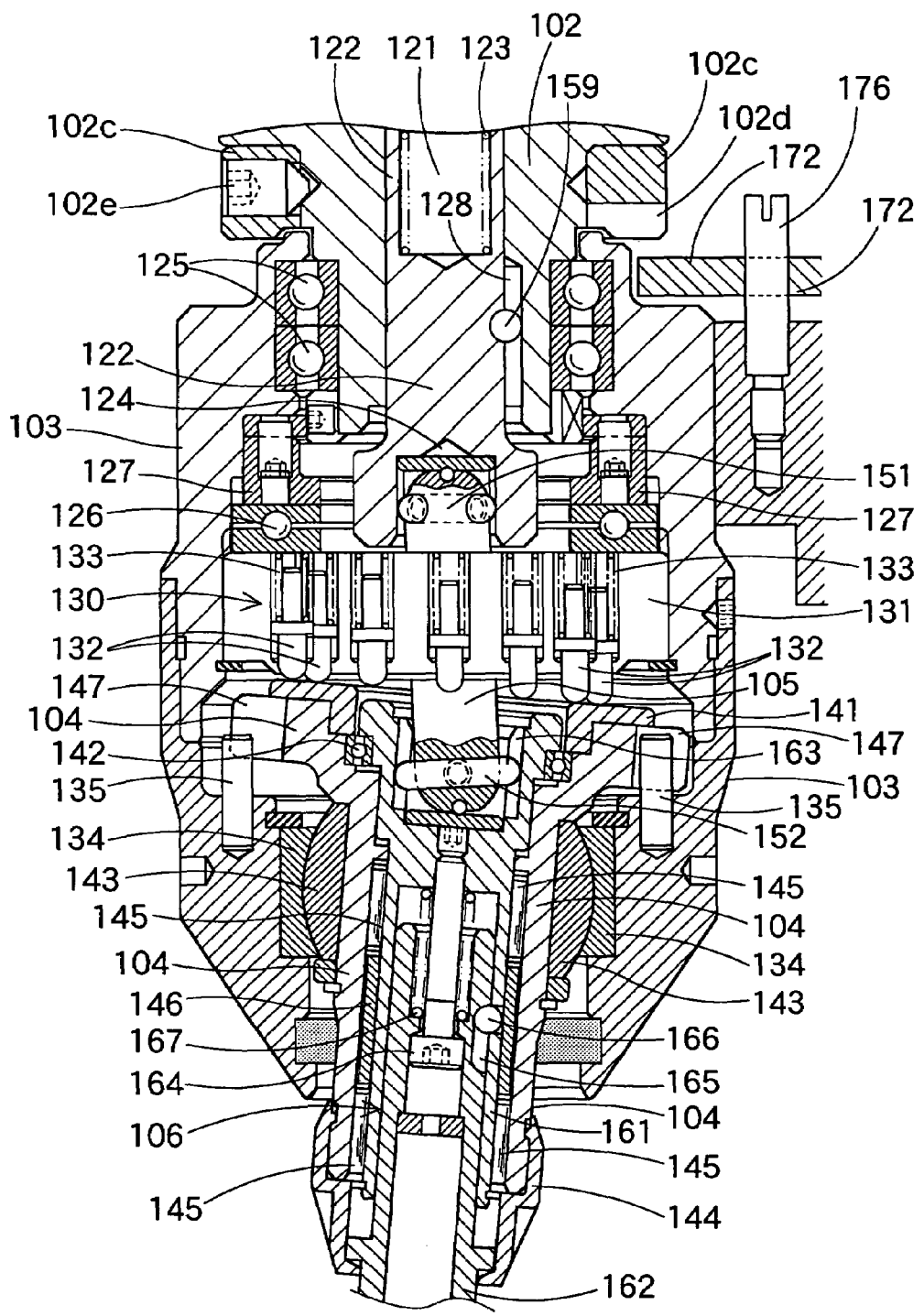
FIG. 23 is a partial enlarged sectional view of a condition in which the holder is tilted.

A flange is provided on the top of the tiltable case 104 and as shown in FIGS. 16, 23, six grooves 147 are formed at an interval of 60 degrees around the circumference. As shown in FIGS. 16, 23, six guide pins 135 are erected at circumferential positions corresponding to the grooves 147 inside the outer case 103 and those guide pins 135 engage the grooves 147 so as to guide the tilt of the tiltable case 104.

Although the tilt of the tiltable case 104 is guided by engagement between the guide pins 135 and the grooves 147, if the connecting angle of the universal joint rod 105 changes or its rotation load changes, the tiltable case 104 receives a reaction force or vibration so that it sometimes may be loose slightly in the circumferential direction, because there is a gap in that engagement although it is slight. However, although the movement of the tiltable case 104 is transmitted to the tilt supporting pin unit 130, vibration or movement of the holder 106 at the time of tilting or restoration originating from such looseness of the tiltable case 104 in the circumferential direction is prevented effectively by the operation of the second bearings 126 and the like because the tilt supporting pin unit 130 and the second bearings 126 are situated in a free state as described above.

The pressure receiving plate 141 is mounted on the flange on the top of the tiltable case 104 and all twelve tilt supporting pins 132 in the pin case 131 always keep contact with the pressure receiving plate 141 regardless of a tilt of the tilting case 104 as shown in FIG. 23. Further, a dust cover 144 is attached to the bottom portion of the tiltable case 104 so as to cover a gap between the tiltable case 104 and the holder 106 inserted into the tilting case.

The holder 106 is situated rotatably in an axial direction through a third bearing 142 and a fourth bearing 145 within the cylindrical tiltable case 104. An outer race of the third bearing 142 is fixed to the upper portion of the tiltable case 104 and an inner race of the third bearing 142 is fixed to the large diameter portion on the upper portion of the holder 106. The fourth bearing 145 is constituted of two needle bearings and a collar 146 is interposed between the two needle bearings. As the fourth bearing 145, a sliding bearing may be used instead of the needle bearing.

In the holder 106, a slidable holder 162 is mounted in a predetermined range in the axial direction inside the cylindrical holder main body 161. A joint concave portion 163 is formed to be open upward in the large diameter portion of the upper portion of the holder main body 161 and substantially semi-circular grooves are formed in a predetermined width at a predetermined interval in the inner peripheral face of the joint concave portion 163. A second universal joint portion 152 on the lower portion of the universal joint rod 105 is fitted into this joint concave portion 163 so that the second universal joint 152 engages with the joint concave portion 163, to transmit a rotation from the second universal joint portion 152 to the holder main body 161. The connecting condition of the second universal joint portion 152 and the holder main body 161 can be tilted in a predetermined angular range in every direction.

The universal joint rod 105 is so constructed that the first universal joint portion 151 is formed at the top portion of an intermediate shaft while the second universal joint portion 152 is provided at the bottom of the intermediate shaft and penetrates through a central space in the pin case 131. The first universal joint portion 151 at the top is fitted to the joint concave portion 124 in the absorption rod 122 and the second universal joint portion 152 at the bottom is fitted into the joint concave portion 163 at the upper portion of the holder main body 161.

The first universal joint portion 151 is formed by fitting pins each having a spherical tip at an interval of 90 degrees to the outer periphery of the semi-spherical portion at the top end of the universal joint rod 105 such that the spherical tips are projected and the second universal joint portion 152 is also formed by fitting pins each having a spherical tip at an interval of 90 degrees to the outer periphery of the semi-spherical portion at the bottom end of the universal joint rod 105 such that the spherical front ends are projected. Consequently, four semi-spherical convex portions 153 are projected in the radial direction from the first universal joint portion 151 and four semi-spherical convex portions 154 are projected in the radial direction from the second universal joint portion 152. The four semi-spherical convex portions 153 and the four semi-spherical convex portions 154 are disposed with their angles in the radial direction deviated by 45 degrees, so that the universal joint rod 105 can be tilted more smoothly.

The holder 162 is installed slidably within the holder main body 161 of the holder 106 and a bolt-type supporting rod 164 is attached to go through the axial position in order to determine the sliding range and a spring (coil spring) 167 is fitted around the outer peripheral portion of the supporting rod 164 so that the slidable holder 162 is urged downwards. This spring 167 absorbs the force created by sliding the slidable holder 162 upward when the cutter 109 receives a shock from the work piece so as to absorb that shock.

As shown in FIG. 23, an engagement groove 165 is formed in the axial direction in the outer peripheral portion of the slidable holder 162 and an engaging steel ball 166 engages that engagement groove 165. The engaging steel ball 166 engages an engagement hole on the side of the holder main body 161 so that the holder main body 161 and the slidable holder 162 can be rotated integrally while allowing the slidable holder 162 to slide in the axial direction. A chuck 169, to which the cutter 109, for example a deburring grinder is to be attached, is mounted to the leading end of the sliding holder 162.

Figure 20:
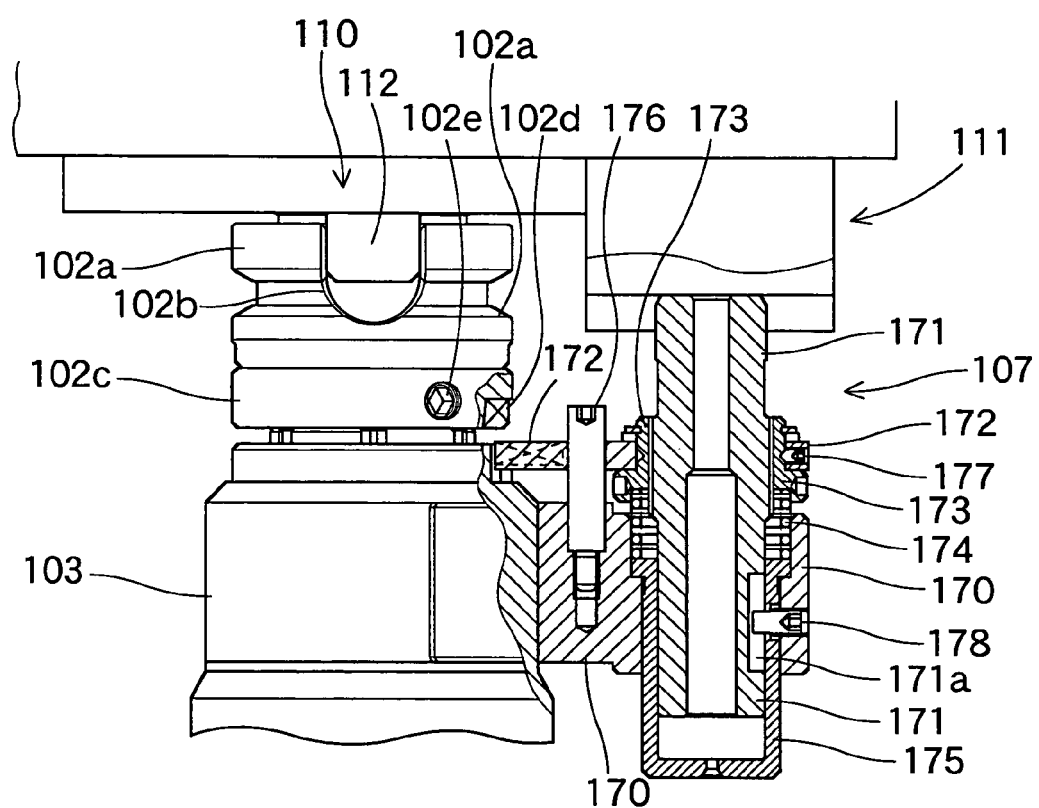
FIG. 20 is an enlarged partial sectional view showing the vicinity of the positional engaging portion.

On the other hand, as shown in FIG. 20, a positional engaging portion 107 is provided on the top portion of the outer case 103 in order to position the outer case 103 of the processing tool with respect to the machine tool. The positional engaging portion 107 has a holding portion 170 projecting sideways from the outer case 103 and a positioning pin 171 is inserted into a hole formed longitudinally in the holding portion 170 in such a way that it is movable vertically. A cup-like cover 175 is fitted to the bottom of the hole in the holding portion 170 and a spring member (coil spring) 174 is accommodated in the hole in the upper portion of the cover 175 and then, the positioning pin 171 is urged upwards and held by this spring member 174.

A male screw portion is formed on the threads on the outer periphery of the positioning pin 171 and an adjusting nut 173 is mounted to the male screw portion by engagement of their threads. A groove 171a is formed in the bottom portion of the positioning pin 171 and the leading end of a locking screw inserted from the outside of the holding portion 170 is fitted into that groove 171a so as to allow a sliding motion thereof in a vertical direction while blocking the positioning pin 171 from rotating. Although the root of the rotation stopper key 172 is fitted to the outer peripheral portion of the adjusting nut 173 and installed thereto, the adjusting nut can rotate independently of the rotation stopper key 172. The positioning pin 171 can be moved vertically by turning the adjusting nut 173. A set of engaging holes are made in the outer peripheral portion of the adjusting nut 173 and the adjusting nut 173 can be rotated using a dedicated wrench with the projection of the dedicated wrench inserted in this engaging hole.

A locking screw 177 is screwed into the root of the rotation stopper key 172 so that the rotation stopper key 172 can be fixed to the adjusting nut 173 with the locking screw 177. Further, the protruding end portion of the rotation stopper key 172 is guided by a guide shaft 176 erected from the holding portion 170 so that it is directed toward an orientation ring 102c above the outer case 103 and consequently, it can move vertically together with the adjusting nut 173 and the positioning pin 171.

A protruding end of the rotation stopper key 172 has the function of matching the orientation ring 102c or an angular position of the ring portion 102a of the shank 102 with the positioning pin 171 by engaging the protruding end thereof with a cutout portion (engaging portion) in the orientation ring 102c attached to the bottom of the shank 102.

On the other hand, as shown in FIG. 20, the main spindle 110 of the machine tool has a key 112 provided projectingly. When installing the shank 102 of the processing tool 101 to the main spindle 110 by inserting it into a hole in the bottom portion of the main spindle 110, a drive key 112 is fitted to a key groove 102b provided in a ring portion 102a of the shank 102, so that the processing tool 101 is mounted to the main spindle 110. At this time, the positioning pin 171 for determining the position of the case 103 of the processing tool 101 is fitted to a concave portion in a positioning block 111 on the fixed side of the machine tool and positioned. The angular relation between the key groove 102b and the positioning block 111 may vary depending on the machine tool.

Thus, the orientation ring 102c is fitted rotatably to the bottom portion of the ring portion 102a of the shank 102 and a screw hole is drilled in the orientation ring 102c and then, the locking screw 102e is screwed therein so as to fix the orientation ring 102c relative to the shank 102. As shown previously, a cutout (engaging) portion 102d is formed in part of the orientation ring 102c and the protruding end of the rotation stopper key 172 can be fitted thereto.

Figure 19:
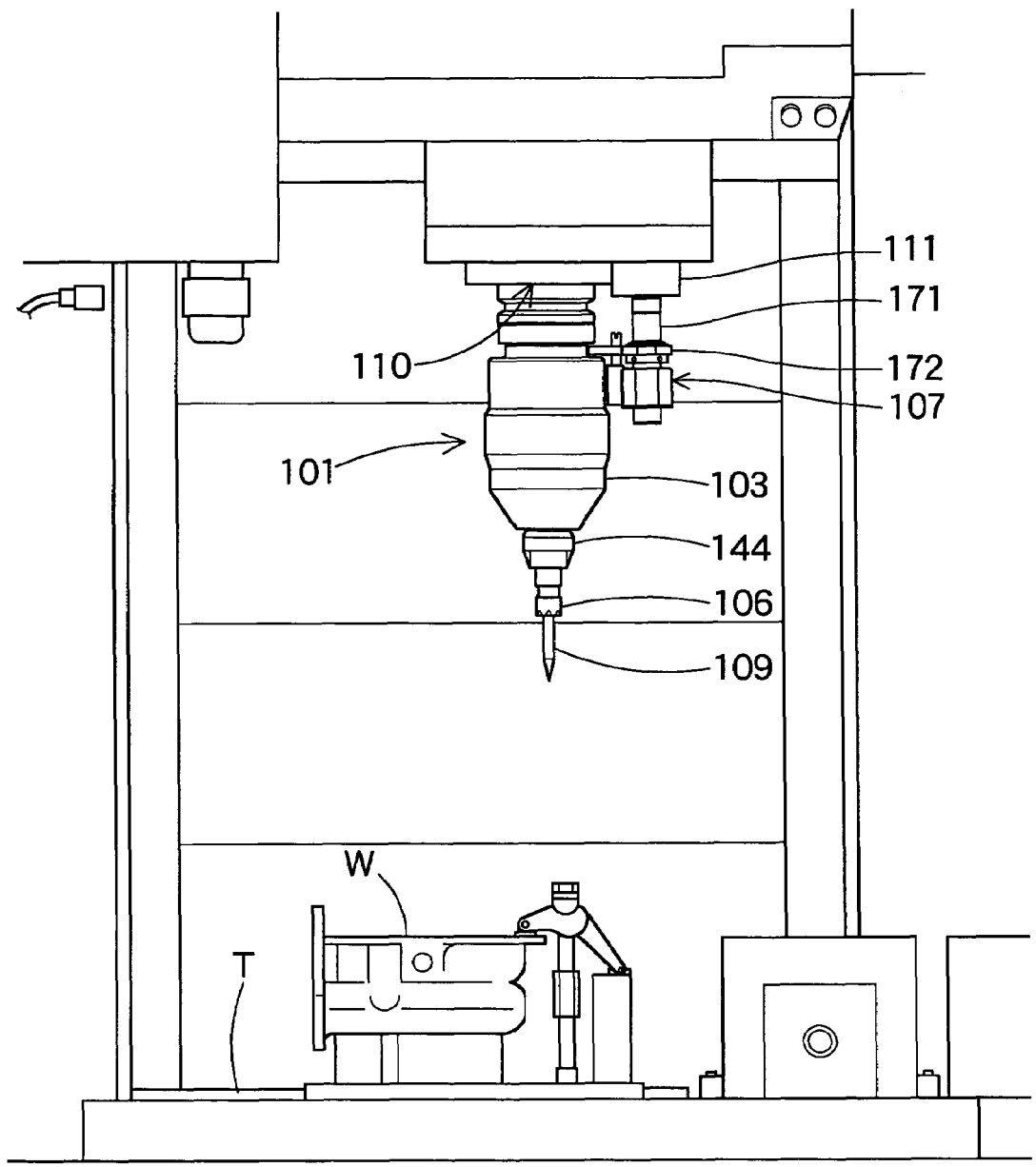
FIG. 19 is a front view showing use condition of the processing tool.

In the processing tool 101 having the above-described configuration, the cutter (tool tip) 109, for example, a deburring grind stone, is attached to the chuck portion 169 at the leading end of the holder 106 and as shown in FIG. 19, the shank 102 is fitted to the main spindle 110 of the machine tool such as a machining center. Then, the processing tool 101 is positioned to a predetermined angle by fitting the positioning block 111 on the side of the machine tool spindle to the positional engaging portion 107 and mounted securely in the following manner.

Figure 21:
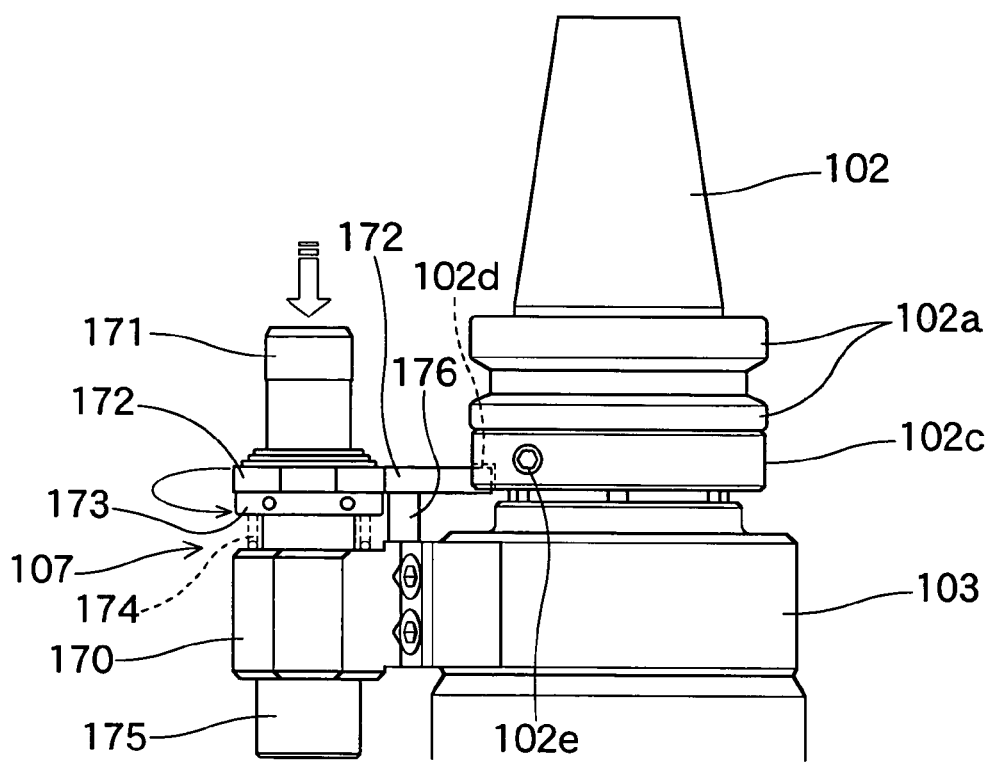
FIG. 21 is a partial front view of the positional engaging portion.
Figure 22:
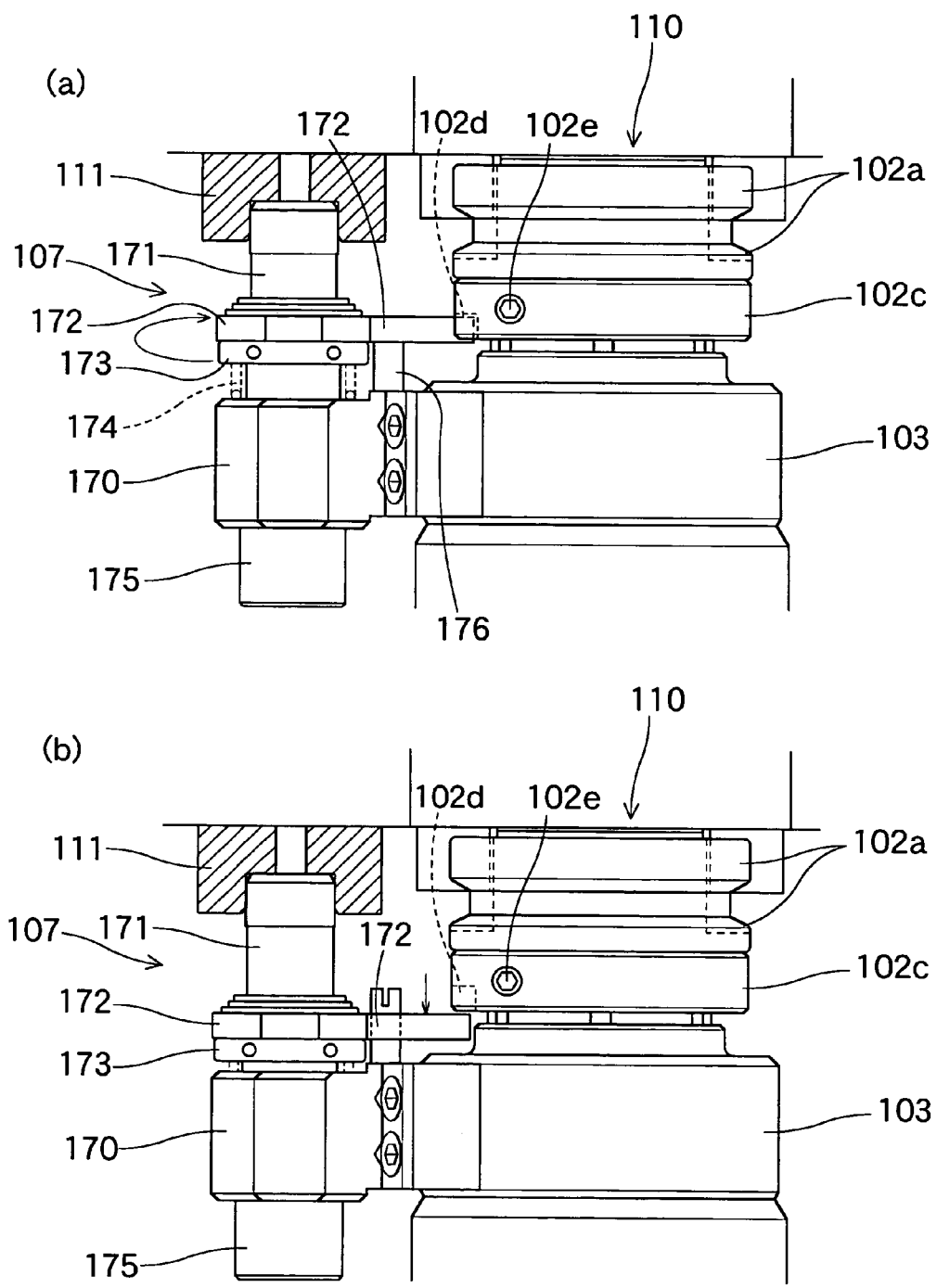
FIG. 22(a) is a partial front view when the rotation stopper key of the positional engaging portion is engaged.
FIG. 22(b) is a partial front view when engagement of the rotation stopper key is released.

That is, the processing tool 101 is set in a condition as shown in FIG. 21 and in this condition, the locking screw 177 is loosened so as to bring the adjusting nut 173 to a rotatable condition and then, the adjusting nut 173 is turned to the left using a dedicated wrench to lower the positioning pin 171 until its lower limit. Then, the orientation ring 102c is allowed to rotate by loosening the locking screw 102e of the orientation ring 102c.

Next, with the processing tool 101 in this condition, the shank 102 is fitted to a recessed portion in the main spindle 110 of the machine tool and with the positioning pin 171 of the positional engaging portion 107 matched with the recessed portion in the bottom face of the positioning block 111 on the side of the machine tool spindle, the manual tool installation unit of the machine tool is operated so as to fix the shank 102 to the main spindle 110. As shown in FIG. 22a, the shank 102 is coupled with the main spindle 110 of the machine tool so that the positioning pin 171 is fitted to the recessed portion in the bottom face of the positioning block 111 on the side of the machine tool spindle.

Next, the adjusting nut 173 of the positioning engaging portion 107 is turned to the right using a dedicated wrench to lower the adjusting nut 173 and the rotation stopper key 172 with respect to the static positioning pin 171, so that as shown in FIG. 22b, the protruding end of the rotation stopper key 172 retreats from the cutout portion 102d in the orientation ring 102c so as to allow a predetermined gap between the protruding end of the rotation stopper key 172 and the orientation ring 102c.

On this condition, setting of the processing tool 101 to the machine tool is finished. The orientation ring 102c is fixed to the shank 102 by tightening the locking screw 102e of the orientation ring 102c and the rotation stopper key 172 is fixed to the adjusting nut 173 by tightening the locking screw 177.

At this time, it is verified that the protruding end of the rotation key 172 is aligned just below the cutout portion 102d in the orientation ring 102c. This verification can be carried out by, removing the shank 102 from the main spindle 110 by operating the manual tool installation unit of the machine tool to execute its tool removal action, while confirming that the positioning pin 171 is raised by the urging force of the spring member 174 together with the adjusting nut 173 and the rotation stopper key 172 so that the front end of the rotation stopper key 172 engages the cutout portion 102d in the orientation ring 102c.

In this way, the positional engaging portion 107 of the processing tool 101 can be adjusted easily with a simple operation by turning the adjusting nut 173 as described above relative to a variety of machine tools in which the angular positions of the main spindle and positioning block are different.

Next, the operation of the processing tool 101 will be described. When the main spindle 110 of the machine tool is rotated, the shank 102 is also rotated and then, the absorption rod 122, universal joint rod 105 and holder 106 are rotated by the rotation of the shank 102. The case 103 and the tiltable case 104 located on the outside maintain a static state by engagement between the positional engagement portion 107 and the machine tool fixing portion 111. With the outer case 103 and the tiltable case 104 held in the static state, the holder 106 and the cutter 109 gripped thereby are driven at a very high velocity of for example, about 10,000 rpm.

A work piece W, which is a deburring object, is fixed to the movable table of the machine tool as shown in FIG. 19 and the machine tool descends the main spindle 110 up to a predetermined position and moves the movable table T on its control coordinates according to a predetermined program with the cutter 109 kept in contact with an edge portion of the work piece W. Consequently, when the contact position of the cutter 109 is moved along the edge portion of the work piece W, burr on the edge portion of the work piece W is ground off by the cutter 109 rotating at a high velocity to execute removal of the burr.

Figure 18:
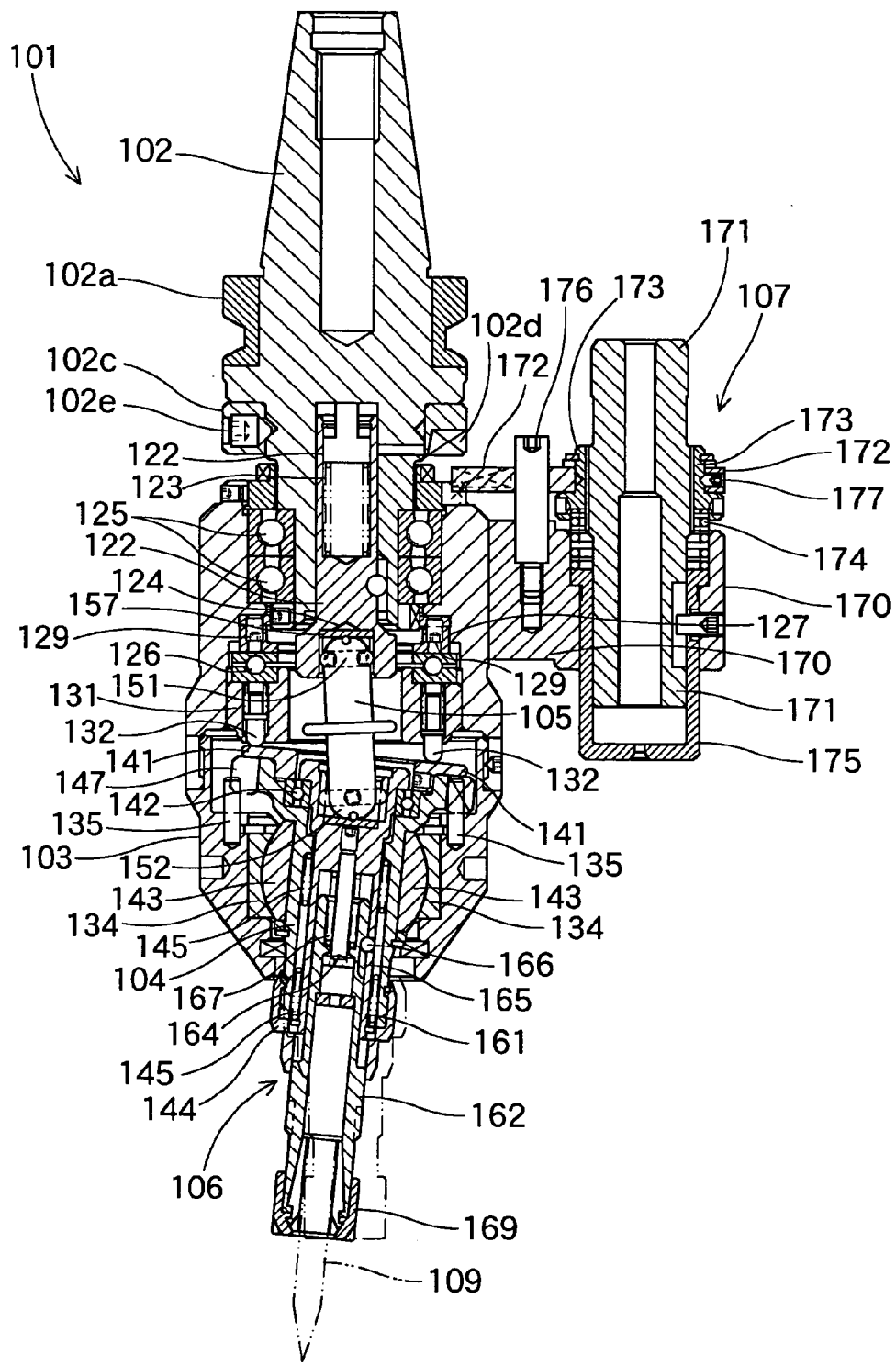
FIG. 18 is a longitudinal sectional view of a condition in which the tiltable holder is tilted.

If the side face of the front end of the cutter 109 rotating rapidly comes into contact with the edge portion of the work piece W and the cutter 109 receives a load from sideways, the tiltable case 104 tilts from the axis of the main spindle at an angle corresponding to the load, for example, in an angular range of about 5 degrees in maximum tilting angle with respect to the case 103 located outside. At this time, the tiltable case 104 rotates around a central point of the spherical face of each of the spherical sliding bearings 143, 134 with respect to the case 103. The holder 106 within the tiltable case 104 tilted by this rotation receives a rotational force of the main spindle through the shank 102, the absorption rod 122 and the universal joint rod 105 and is rotated. When the holder 106 is tilted together with the tiltable case 104 as shown in FIGS. 18, 23, the holder 106 is tilted around a central point of each of the spherical sliding bearings 134, 143 on a lower side relative to the connecting portion of the universal joint rod 105 on the top end thereof and the universal joint rod 105 tilts around the vicinity of its intermediate point.

Thus, when the universal joint rod 105 and the holder 106 are tilted, vibration in the axial direction and the like occur due to a minute change in the connecting length between the absorption rod 122 and the universal joint rod 105 and the connecting length between the universal joint rod 105 and the holder 106. Vibration in the axial direction and shock on the absorption rod 122 and universal joint rod 105, however are absorbed favorably by the absorption spring 123 in the absorption rod 122. Because the vibration in the axial direction of the absorption rod 122 and the universal joint rod 105 when the holder 106 is tilted is absorbed by the absorption spring 123, when tilting the holder 106 with the cutter 109 kept in contact with the work piece W, the holder 106 can be tilted smoothly while maintaining a rapid rotation of the cutter 109 stably.

When the front end of the cutter 109 rotating at a high velocity comes into contact with the edge portion of the work piece W, a push-up force in the axial direction received by the cutter 109 from the work piece is absorbed by the spring 167 of the sliding holder 162 so as to stabilize the processing. As shown in FIG. 18, the cutter 109 tilts together with the holder 106 so as to remove burr while the front end side of the cutter 109 is applying an appropriate contact load to a burred portion of the work piece W. A pressing load when the front end of the cutter 109 presses the work piece W is applied to the pressure receiving plate 141 on the top end of the holder 106, the pressing load being applied by a plurality of tilt supporting pins 132 each having a spring 133 within the tilt supporting pin unit 130. Because these tilt supporting pins 132 are disposed in multiple quantity around the circumference, they can apply the same load in a stable condition even when the cutter 109 and the holder 106 are tilted in any direction so as to execute deburring of the work piece W favorably.

In this way, the force of the spring 133 of the tilt supporting pin 132 acts as a pressing load on the cutter 109 against the work piece W. The force which applies the pressing load to the work piece W is given by the plurality of springs 133 located around the circumference, different from the absorption spring 123 and spring 167 which are for absorbing force in the axial direction of the holder 106 and universal joint rod 105, so that the cutter 109 can generate a force pressing against the work piece W stably.

Further, when the cutter 109 leaves the work piece W, the tilting state of the cutter 109 and the holder 106 can be returned to a linear state. Particularly, when the holder 106 returns to the linear state with its rotation load dropped rapidly and its tilting load released, a condition in which the returning motion of the holder rotating rapidly becomes unstable so that the holder 106 vibrates or swings randomly and cannot return to the linear state easily is likely to occur.

However, because in this processing tool, as described above, the force by which the holder 106 is returned from the tilting state to the linear state is absorbed by the spring 133 and the absorption spring 123 in the independent tilt supporting pin unit 130, the holder 106 and the cutter 109 can be returned to a linear state extremely smoothly without any vibration when the cutter 109 leaves the work piece W. Further, because the tilt supporting pin unit 130 is situated in a free state and then mounted through the second bearing 126 in a free state, the tilt supporting pin unit 130 moves smoothly in the circumferential direction when the holder is tilted so as to absorb the reaction of the tiltable case 104 thereby making it possible to return the holder 106 and the cutter 109 smoothly to a linear state.

Figure 17:
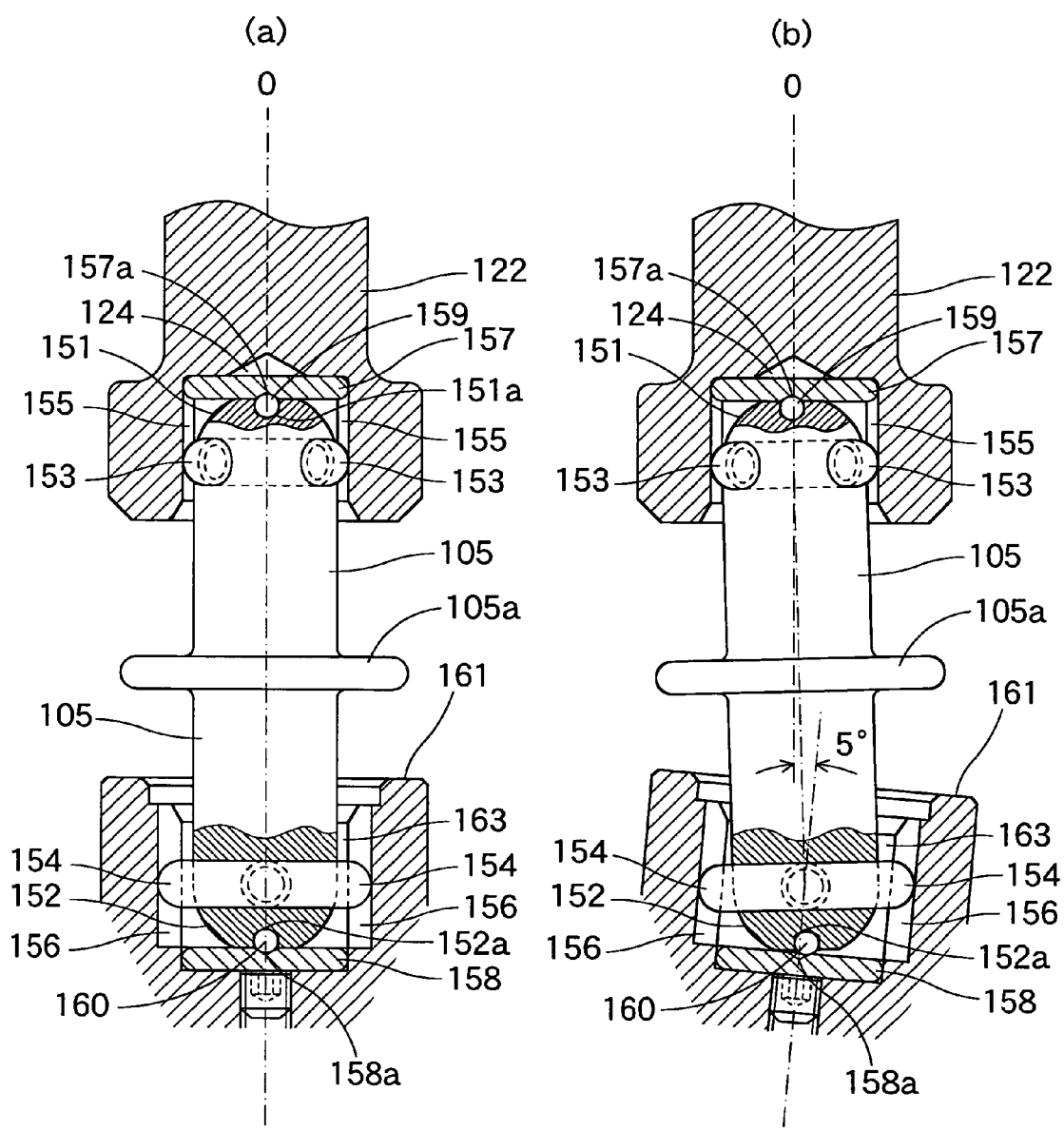
FIG. 17(*a*) is an enlarged view of the vicinity of the universal joint rod in a linear state and FIG. 17(*b*) is an enlarged view of the vicinity of the universal joint rod in a tilted state.

As shown in FIG. 17, a metal ball 159 is fitted rotatably to a fitting hole 151a formed in the center of the top end of the first universal joint portion 151 and the metal ball 159 is also fitted movably to a receiving recessed portion 157a provided in a supporting plate 157 in the center of the bottom end portion of the absorption rod 122. Likewise, a metal ball 160 is fitted to a fitting hole 152a formed in the center of the bottom end of the second universal joint portion 152 and then, the metal ball 160 is also fitted movably to a receiving recessed portion 158a provided in a supporting plate 158 in the center of the top end portion of the holder 106.

Thus, although the metal balls 159, 160 are located substantially in the center of the receiving recessed portions 157a, 158a on both sides of the universal joint rod 105 when the universal joint rod 105 is in the linear state to the absorption rod 122 and the holder 106, when the universal joint rod 105 is tilted relative to the absorption rod 122 and the holder 106, the metal balls 159, 160 move restorably outward substantially from the center of the receiving recessed portions 157a, 158a as shown in FIG. 17b. When the holder 106 is returned to a linear state, the movement of the tilt supporting pin unit 130 in the circumferential direction is smoothed so as to prevent vibration of the holder 106 and the cutter 109.

Because the second bearings 126 located just above the tilt supporting pin 130 are disposed in a free state with its height adjusted, when the pin case 131 receives a force in the circumferential direction due to the influence of the universal joint rod 105 rotating at a high velocity, the second bearings 126 in a free state allows a free rotation of the pin case 131, so that when the cutter 109 leaves the work piece W, the holder 106 and the cutter 109 can be returned smoothly from a tilted state to a linear state.

What is claimed is:

1. A processing tool comprising:
   a shank attached detachably to the main spindle of a machine tool;
   a case mounted to the outer portion of the bottom portion of said shank through a bearing;
   a positional engaging portion which is provided in said case and engages a fixed portion of the machine tool so as to position said case in a static state when mounted to said main spindle;
   an absorption rod which is situated slidably in the axial direction in an axial hole provided in the axial direction of the bottom end of said shank;
   an absorption spring installed between said absorption rod and said shank with said absorption rod urged in the axial direction;
   a tiltable case situated relative to the axial direction on the bottom within said case;
   a holder situated rotatably through a bearing within said tiltable case;
   a slidable holder which is situated in the axial direction within said holder and provided with a chuck portion for a tool at a leading end thereof;
   a spring installed between said holder and said slidable holder with said slidable holder urged in the axial direction;
   a universal joint which connects a bottom end portion of said absorption rod with a top end portion of said holder such that it is capable of being tilted freely so as to transmit a rotation;
   a tilt supporting pin unit which is situated within said case located around the outer peripheral portion of said universal joint and includes a plurality of tilt supporting pins projecting downward with the respective tilt supporting pins urged downwards by said springs; and
   a pressure receiving plate which is provided above said tilting case and allows the tips of each tilt supporting pin of said tilt supporting pin unit to make contact therewith.

2. The processing tool according to claim 1 wherein said tilt supporting pin unit is so constructed that a plurality of said tilt supporting pins are aligned around a circumference within a circularly formed pin case such that the tips thereof project downward; a spring is mounted to each tilt supporting pin such that said tilt supporting pin is urged to project downwards; and said tilt supporting pin unit is situated rotatably in a free state within said case.

3. The processing tool according to claim 2 wherein a ball bearing is situated rotatably in a free state on the upper side of said tilt supporting pin unit.

4. The processing tool according to claim 3 wherein an adjusting nut for height adjustment is mounted above a ball bearing in said case by engagement of screws and the width of gap above said ball bearing is adjustable by screwing said adjusting nut.

5. The processing tool according to claim 1 wherein said universal joint is constituted of a first universal joint portion connected to the bottom of an absorption rod and a second universal joint portion connected to the top portion of a holder, those universal joint portions being provided on the top and bottom of an intermediate shaft and said first universal joint portion is connected to said absorption rod such that it is capable of tilting in every direction on the circumference and slidable in the axial direction while said second universal joint portion is connected to said holder such that it is capable of tilting in every direction on the circumference and slidable in the axial direction.

6. The processing tool according to claim 5 wherein a disc portion is formed on an intermediate shaft of said universal joint and semi-spherical recessed portions to which a steel ball is fitted are formed in said first universal joint portion and said second universal joint portion and grooves to which said steel ball is fitted are formed in the axial direction in said joint recessed portions of said absorption rod and said holder.

7. The processing tool according to claim 1 wherein said tiltable case is situated such that it is capable of tilting in a predetermined angular range through a spherical sliding bearing within said case.

8. The processing tool according to claim 1 wherein said holder is situated rotatably through plural bearings including at least two bearings within said tiltable case.

9. The processing tool according to claim 5 wherein a metal ball is fitted rotatably to a fitting hole formed in the center of the top end of said first universal joint while said metal ball is fitted to a receiving recessed portion provided in the center of the bottom end portion of said absorption rod; a metal ball is fitted rotatably to a fitting hole formed in the center of the bottom end of said second universal joint while said metal ball is fitted to a receiving recessed portion provided in the center of the top end portion of said holder; when said universal joint rod is in a linear state relative to said absorption rod and said holder, a condition in which said metal balls on both sides engage said receiving recessed portions on both sides; and when said universal joint rod tilts relative to said absorption rod and said holder, said metal ball on at least one side moves substantially outward from the center and when said universal joint rod returns to a linear state with tilting load released, said metal ball returns to substantially to the center of said receiving recessed portion.

10. The processing tool according to claim 5 wherein a disc portion is formed on an intermediate shaft of said universal joint rod; semi-spherical projections are formed near the top end portion of said first universal joint portion and near the bottom end portion of said second universal joint portion; and grooves to which said semi-spherical projections are fitted are formed in said joint recessed portions of said absorption rod and said holder.

11. The processing tool according to claim 1 further comprising of a positional engaging portion which when said shank is mounted to the main spindle of said machine tool, engages a fixed portion of said machine tool to position the case in a static state, wherein said positional engaging portion is held by a holding portion whose positioning pin projects sideways from the case such that it is slidable in a vertical direction and urged upwards by a spring; a male screw portion is formed on the outer periphery of said positioning pin; an adjusting nut is mounted on said male screw portion by engagement of the screws; a rotation stopper key is mounted on the outer periphery of said adjusting nut such that a protruding end thereof is capable of engaging an engaging portion in an orientation ring attached to the bottom of said shank while allowing said adjusting nut to rotate; and said positioning pin and said rotation stopper key are movable by turning said adjusting nut.

* * * * *